(12) United States Patent
Pollack et al.

(10) Patent No.: US 7,949,435 B2
(45) Date of Patent: May 24, 2011

(54) USER INTERFACE AND USER CONTROL IN A POWER AGGREGATION SYSTEM FOR DISTRIBUTED ELECTRIC RESOURCES

(75) Inventors: Seth B. Pollack, Seattle, WA (US); Seth W. Bridges, Seattle, WA (US); David L. Kaplan, Seattle, WA (US)

(73) Assignee: V2Green, Inc., Seattle, WA (US)

( * ) Notice: Subject to any disclaimer, the term of this patent is extended or adjusted under 35 U.S.C. 154(b) by 520 days.

(21) Appl. No.: 11/836,756

(22) Filed: Aug. 9, 2007

(65) Prior Publication Data
US 2008/0039989 A1    Feb. 14, 2008

Related U.S. Application Data

(60) Provisional application No. 60/822,047, filed on Aug. 10, 2006, provisional application No. 60/869,439, filed on Dec. 11, 2006, provisional application No. 60/915,347, filed on May 1, 2007.

(51) Int. Cl.
*G05D 17/00* (2006.01)
*G05D 3/00* (2006.01)
*G01R 11/56* (2006.01)
*B60Q 1/26* (2006.01)
*G06Q 40/00* (2006.01)

(52) U.S. Cl. ............ 700/291; 701/22; 705/37; 705/412; 315/80

(58) Field of Classification Search .................. 700/291; 701/22; 705/412, 37; 315/80
See application file for complete search history.

(56) References Cited

U.S. PATENT DOCUMENTS

| | | | |
|---|---|---|---|
| 5,642,270 A | 6/1997 | Green et al. | |
| 5,761,083 A | 6/1998 | Brown, Jr. et al. | |
| 5,767,584 A | 6/1998 | Gore et al. | |
| 6,081,205 A * | 6/2000 | Williams | 340/932.2 |
| 6,388,564 B1 | 5/2002 | Piercy et al. | |
| 6,673,479 B2 | 1/2004 | McArthur et al. | |
| 6,697,951 B1 | 2/2004 | Sinha et al. | |

(Continued)

FOREIGN PATENT DOCUMENTS
JP    2002044870    2/2002
(Continued)

OTHER PUBLICATIONS

Kempton et al., "Vehicle-to-Grid—Power Fundamentals: Calculating Capacity and Net Revenue" 2004, Jounral of Power Sources p. 1-12.*
PCT Search Report and Written Opinion for PCT Application No. PCT/US2007/025393 mailed on May 19, 2008, 8 pgs.
(Continued)

*Primary Examiner* — Ramesh B Patel
*Assistant Examiner* — Thomas Stevens
(74) *Attorney, Agent, or Firm* — Greenberg Traurig, LLP

(57) ABSTRACT

Systems and methods are described for a power aggregation system. In one implementation, a service establishes individual Internet connections to numerous electric resources intermittently connected to the power grid, such as electric vehicles. The Internet connection may be made over the same wire that connects the resource to the power grid. The service optimizes power flows to suit the needs of each resource and each resource owner, while aggregating flows across numerous resources to suit the needs of the power grid. The service can bring vast numbers of electric vehicle batteries online as a new, dynamically aggregated power resource for the power grid. Electric vehicle owners can participate in an electricity trading economy regardless of where they plug into the power grid.

16 Claims, 23 Drawing Sheets

U.S. PATENT DOCUMENTS

| | | |
|---|---|---|
| 6,925,361 B1 | 8/2005 | Sinnock |
| 7,142,321 B2 | 11/2006 | Tomita et al. |
| 7,142,949 B2 | 11/2006 | Brewster et al. |
| 7,248,978 B2 | 7/2007 | Ransom |
| 7,259,474 B2 | 8/2007 | Blanc |
| 7,402,978 B2 | 7/2008 | Pryor |
| 2002/0016624 A1 | 2/2002 | Patterson et al. |
| 2002/0087234 A1 | 7/2002 | Lof et al. |
| 2004/0030457 A1 | 2/2004 | Bayoumi et al. |
| 2004/0110044 A1 | 6/2004 | McArthur et al. |
| 2004/0169489 A1 | 9/2004 | Hobbs |
| 2005/0125243 A1 | 6/2005 | Villalobos |
| 2005/0182889 A1 | 8/2005 | Davis et al. |
| 2006/0047369 A1 | 3/2006 | Brewster et al. |
| 2006/0276938 A1 | 12/2006 | Miller |
| 2006/0287775 A1 | 12/2006 | Bechtold et al. |
| 2006/0291482 A1 | 12/2006 | Evans |
| 2007/0005192 A1 | 1/2007 | Schoettle et al. |
| 2007/0043549 A1 | 2/2007 | Evans et al. |
| 2007/0282495 A1 | 12/2007 | Kempton et al. |
| 2008/0211230 A1 | 9/2008 | Gurin |
| 2008/0281663 A1 | 11/2008 | Hakim et al. |
| 2009/0048716 A1* | 2/2009 | Marhoefer .................... 700/291 |

FOREIGN PATENT DOCUMENTS

| | | |
|---|---|---|
| JP | 2002354609 A | 12/2002 |
| KR | 20020066654 A | 8/2002 |
| KR | 1019980048444 | 9/2008 |
| WO | WO9930412 A1 | 6/1999 |
| WO | WO9930434 | 6/1999 |
| WO | WO0106432 A1 | 1/2001 |
| WO | WO02074573 A2 | 9/2002 |
| WO | WO03084022 A1 | 10/2003 |

OTHER PUBLICATIONS

International Search Report and Written Opinion for PCT Application No. PCT/US2007/025436, mailed on Jun. 11, 2008, 7 pgs.

International Search Report and Written Opinion for PCT Application No. PCT/US2007/025439, mailed on Jun. 11, 2008, 6 pgs.

Brooks, "Electric Drive Vehicles: A Huge Distributed Energy Resource", AC Propulsion, Inc., San Dimas, CA, 2001, www.acpropulsion.com.

Brooks, "Vehicle-to-Grid Demonstration Project: Grid Regulation Ancillary Service with a Battery Electric Vehicle", Dec. 10, 2002, AC Propulstion, Inc., www.acpropulsion.com.

Kempton, et al., "Electric Vehicles as a New Power Source for Electric Utilities", Transpn Res.-D, vol. 2, No. 3, 1997, pp. 157-175.

Kempton, et al., "Vehicle-to-Grid Power: Battery, Hybrid, and Fuel Cell Vehicles as Resources for Distributed Electric Power in California", Insitute of Transportation Studies, UC Davis, 2001, Paper UCD-ITS-RR-01-03.

Kempton, et al., "Vehicle-to-Grid Power Implementation: From Stabilizing the Grid to Supporting Large-Scale Renewable Energy", Elsevier, Apr. 11, 2005, Journal of Power Sources, http://www.udel.edu/V2G/KempTom-V2G-Implementation05.PDF.

PCT International Search Report and Written Opinion for PCT Application No. PCT/US2007/025442 mailed on Feb. 23, 2009, 11 pgs.

PCT International Search Report and Written Opinion for PCT Application No. PCT/US2008/080390 mailed on Apr. 28, 2009, 12 pgs.

PCT International Search Report and Written Opinion for PCT Application No. PCT/US2008/080394 mailed on Apr. 28, 2009, 12 pgs.

* cited by examiner

USER INTERFACE AND USER CONTROL IN A POWER AGGREGATION SYSTEM FOR DISTRIBUTED ELECTRIC RESOURCES

RELATED APPLICATIONS

This application claims priority to U.S. Provisional Patent Application No. 60/822,047 to David L. Kaplan, entitled, "Vehicle-to-Grid Power Flow Management System," filed Aug. 10, 2006 and incorporated herein by reference; U.S. Provisional Patent Application No. 60/869,439 to Seth W. Bridges, David L. Kaplan, and Seth B. Pollack, entitled, "A Distributed Energy Storage Management System," filed Dec. 11, 2006 and incorporated herein by reference; and U.S. Provisional Patent Application No. 60/915,347 to Seth Bridges, Seth Pollack, and David Kaplan, entitled, "Plug-In-Vehicle Management System," filed May 1, 2007 and incorporated herein by reference.

This application is also related to U.S. patent application Ser. No. 11/836,741, entitled, "Power Aggregation System for Distributed Electric Resources" by Kaplan et al., filed concurrently on Aug. 9, 2007, and incorporated herein by reference; to U.S. patent application Ser. No. 11/836,743, entitled, "Electric Resource Module in a Power Aggregation System for Distributed Electric Resources" by Bridges et al., filed concurrently on Aug. 9, 2007, and incorporated herein by reference; to U.S. patent application Ser. No. 11/836,745, entitled, "Electric Resource Power Meter in a Power Aggregation System for Distributed Electric Resources" by Bridges et al., filed concurrently on Aug. 9, 2007, and incorporated herein by reference; to U.S. patent application Ser. No. 11/836,747, entitled, "Connection Locator in a Power Aggregation System for Distributed Electric Resources" by Bridges et al., filed concurrently on Aug. 9, 2007, and incorporated herein by reference; to U.S. patent application Ser. No. 11/836,749, entitled, "Scheduling and Control in a Power Aggregation System for Distributed Electric Resources" by Pollack et al., filed concurrently on Aug. 9, 2007, and incorporated herein by reference; to U.S. patent application Ser. No. 11/836,752, entitled, "Smart Islanding and Power Backup in a Power Aggregation System for Distributed Electric Resources" by Bridges et al., filed concurrently on Aug. 9, 2007, and incorporated herein by reference; and to U.S. patent application Ser. No. 11/836,760, entitled, "Business Methods in a Power Aggregation System for Distributed Electric Resources" by Pollack et al., filed concurrently on Aug. 9, 2007, and incorporated herein by reference.

BACKGROUND

Today's electric power and transportation systems suffer from a number of drawbacks. Pollution, especially greenhouse gas emissions, is prevalent because approximately half of all electric power generated in the United States is produced by burning coal. Virtually all vehicles in the United States are powered by burning petroleum products, such as gasoline or petro-diesel. It is now widely recognized that human consumption of these fossil fuels is the major cause of elevated levels of atmospheric greenhouse gases, especially carbon dioxide ($CO_2$), which in turn disrupts the global climate, often with destructive side effects. Besides producing greenhouse gases, burning fossil fuels also add substantial amounts of toxic pollutants to the atmosphere and environment. The transportation system, with its high dependence on fossil fuels, is especially carbon-intensive. That is, physical units of work performed in the transportation system typically discharge a significantly larger amount of $CO_2$ into the atmosphere than the same units of work performed electrically.

With respect to the electric power grid, expensive peak power—electric power delivered during periods of peak demand—can cost substantially more than off-peak power. The electric power grid itself has become increasingly unreliable and antiquated, as evidenced by frequent large-scale power outages. Grid instability wastes energy, both directly and indirectly (for example, by encouraging power consumers to install inefficient forms of backup generation).

While clean forms of energy generation, such as wind and solar, can help to address the above problems, they suffer from intermittency. Hence, grid operators are reluctant to rely heavily on these sources, making it difficult to move away from standard, typically carbon-intensive forms of electricity.

The electric power grid contains limited inherent facility for storing electrical energy. Electricity must be generated constantly to meet uncertain demand, which often results in over-generation (and hence wasted energy) and sometimes results in under-generation (and hence power failures).

Distributed electric resources, en masse can, in principle, provide a significant resource for addressing the above problems. However, current power services infrastructure lacks provisioning and flexibility that are required for aggregating a large number of small-scale resources (e.g., electric vehicle batteries) to meet medium- and large-scale needs of power services.

Thus, significant opportunities for improvement exist in the electrical and transportation sectors, and in the way these sectors interact. Fuel-powered vehicles could be replaced with vehicles whose power comes entirely or substantially from electricity. Polluting forms of electric power generation could be replaced with clean ones. Real-time balancing of generation and load can be realized with reduced cost and environmental impact. More economical, reliable electrical power can be provided at times of peak demand. Power services, such as regulation and spinning reserves, can be provided to electricity markets to stabilize the grid and provide a significant economic opportunity. Technologies can be enabled to provide broader use of intermittent power sources, such as wind and solar.

Robust, grid-connected electrical storage could store electrical energy during periods of over-production for redelivery to the grid during periods of under-supply. Electric vehicle batteries in vast numbers could participate in this grid-connected storage. However, a single vehicle battery is insignificant when compared with the needs of the power grid. What is needed is a way to coordinate vast numbers of electric vehicle batteries, as electric vehicles become more popular and prevalent.

Low-level electrical and communication interfaces to enable charging and discharging of electric vehicles with respect to the grid is described in U.S. Pat. No. 5,642,270 to Green et al., entitled, "Battery powered electric vehicle and electrical supply system," incorporated herein by reference. The Green reference describes a bi-directional charging and communication system for grid-connected electric vehicles, but does not address the information processing requirements of dealing with large, mobile populations of electric vehicles, the complexities of billing (or compensating) vehicle owners, nor the complexities of assembling mobile pools of electric vehicles into aggregate power resources robust enough to support firm power service contracts with grid operators.

DETAILED DESCRIPTION

Overview

Figure 1:
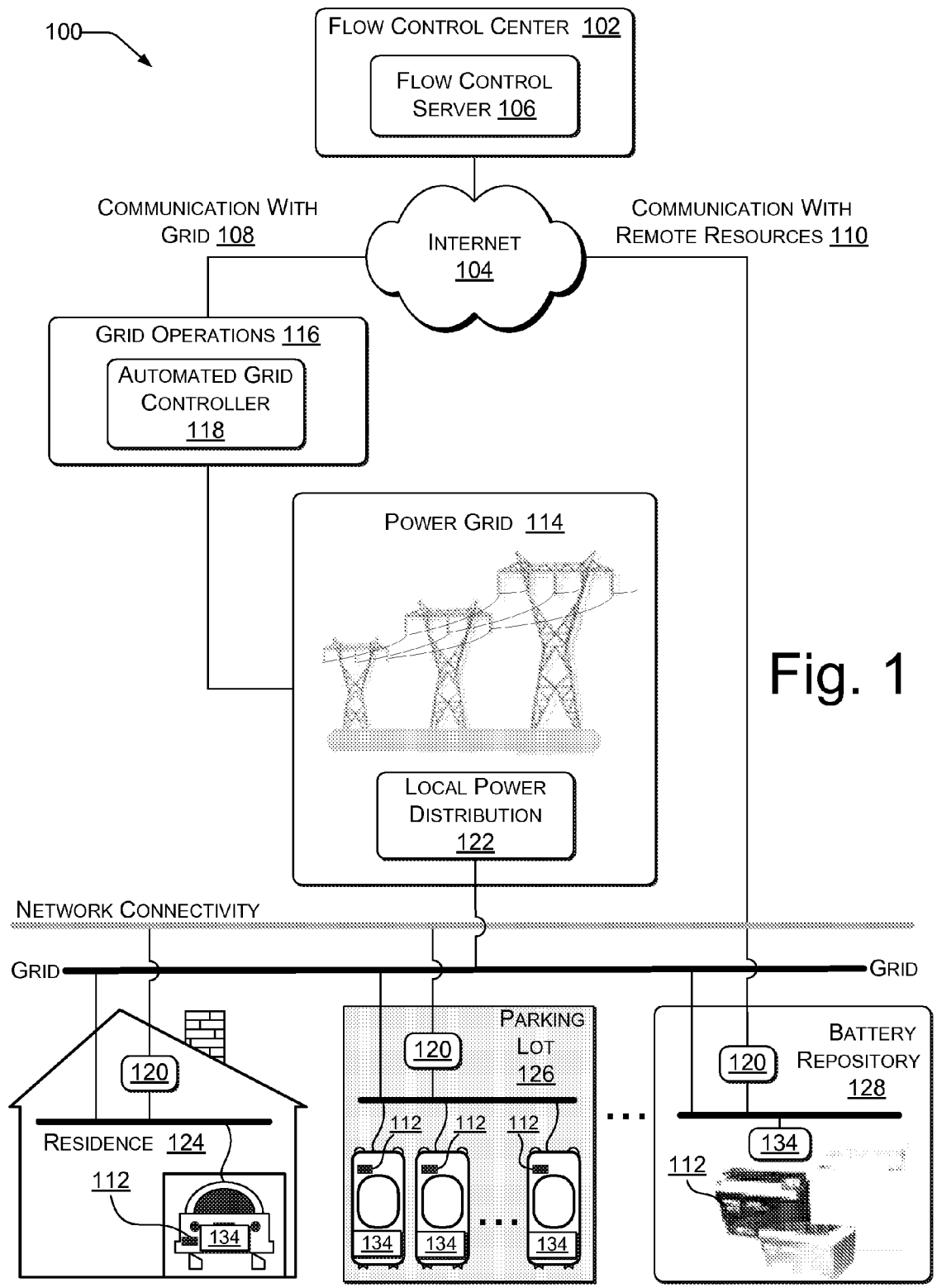
FIG. 1 is a diagram of an exemplary power aggregation system.

Described herein is a power aggregation system for distributed electric resources, and associated methods. In one implementation, the exemplary system communicates over the Internet and/or some other public or private networks with numerous individual electric resources connected to a power grid (hereinafter, "grid"). By communicating, the exemplary system can dynamically aggregate these electric resources to provide power services to grid operators (e.g. utilities, Independent System Operators (ISO), etc). "Power services" as used herein, refers to energy delivery as well as other ancillary services including demand response, regulation, spinning reserves, non-spinning reserves, energy imbalance, and similar products. "Aggregation" as used herein refers to the ability to control power flows into and out of a set of spatially distributed electric resources with the purpose of providing a power service of larger magnitude. "Power grid operator" as used herein, refers to the entity that is responsible for maintaining the operation and stability of the power grid within or across an electric control area. The power grid operator may constitute some combination of manual/human action/intervention and automated processes controlling generation signals in response to system sensors. A "control area operator" is one example of a power grid operator. "Control area" as used herein, refers to a contained portion of the electrical grid with defined input and output ports. The net flow of power into this area must equal (within some error tolerance) the sum of the power consumption within the area and power outflow from the area.

"Power grid" as used herein means a power distribution system/network 122 (See FIG. 1) that connects producers of power with consumers of power. The network may include generators, transformers, interconnects, switching stations, and safety equipment as part of either/both the transmission system (i.e., bulk power) or the distribution system (i.e. retail power). The exemplary power aggregation system is vertically scalable for use with a neighborhood, a city, a sector, a control area, or (for example) one of the eight large-scale Interconnects in the North American Electric Reliability Council (NERC). Moreover, the exemplary system is horizontally scalable for use in providing power services to multiple grid areas simultaneously.

"Grid conditions" as used herein, means the need for more or less power flowing in or out of a section of the electric power grid, in a response to one of a number of conditions, for example supply changes, demand changes, contingencies and failures, ramping events, etc. These grid conditions typically manifest themselves as power quality events such as under- or over-voltage events and under- or over-frequency events.

"Power quality events" as used herein typically refers to manifestations of power grid instability including voltage deviations and frequency deviations; additionally, power quality events as used herein also includes other disturbances in the quality of the power delivered by the power grid such as sub-cycle voltage spikes and harmonics.

"Electric resource" as used herein typically refers to electrical entities that can be commanded to do some or all of these three things: take power (act as load), provide power (act as power generation or source), and store energy. Examples may include battery/charger/inverter systems for electric or hybrid vehicles, repositories of used-but-serviceable electric vehicle batteries, fixed energy storage, fuel cell generators, emergency generators, controllable loads, etc.

"Electric vehicle" is used broadly herein to refer to pure electric and hybrid electric vehicles, such as plug-in hybrid electric vehicles (PHEVs), especially vehicles that have significant storage battery capacity and that connect to the power grid for recharging the battery. More specifically, electric vehicle means a vehicle that gets some or all of its energy for motion and other purposes from the power grid. Moreover, an electric vehicle has an energy storage system, which may consist of batteries, capacitors, etc., or some combination thereof. An electric vehicle may or may not have the capability to provide power back to the electric grid.

Electric vehicle "energy storage systems" (batteries, supercapacitors, and/or other energy storage devices) are used herein as a representative example of electric resources intermittently or permanently connected to the grid that can have dynamic input and output of power. Such batteries can function as a power source or a power load. A collection of aggregated electric vehicle batteries can become a statistically stable resource across numerous batteries, despite recognizable tidal connection trends (e.g., an increase in the total umber of vehicles connected to the grid at night; a downswing in the collective number of connected batteries as the morning commute begins, etc.) Across vast numbers of electric vehicle batteries, connection trends are predictable and such batteries become a stable and reliable resource to call upon, should the grid or a part of the grid (such as a person's home in a blackout) experience a need for increased or decreased power. Data collection and storage also enable the power aggregation system to predict connection behavior on a per-user basis.

Exemplary System

FIG. 1 shows an exemplary power aggregation system 100. A flow control center 102 is communicatively coupled with a network, such as a public/private mix that includes the Internet 104, and includes one or more servers 106 providing a centralized power aggregation service. "Internet" 104 will be used herein as representative of many different types of communicative networks and network mixtures. Via a network, such as the Internet 104, the flow control center 102 maintains communication 108 with operators of power grid(s), and communication 110 with remote resources, i.e., communication with peripheral electric resources 112 ("end" or "terminal" nodes/devices of a power network) that are connected to the power grid 114. In one implementation, powerline communicators (PLCs), such as those that include or consist of Ethernet-over-powerline bridges 120 are implemented at connection locations so that the "last mile" (in this case, last feet—e.g., in a residence 124) of Internet communication with remote resources is implemented over the same wire that connects each electric resource 112 to the power grid 114. Thus, each physical location of each electric resource 112 may be associated with a corresponding Ethernet-over-powerline bridge 120 (hereinafter, "bridge") at or near the same location as the electric resource 112. Each bridge 120 is typically connected to an Internet access point of a location owner, as will be described in greater detail below. The communication medium from flow control center 102 to the connection location, such as residence 124, can take many forms, such as cable modem, DSL, satellite, fiber, WiMax, etc. In a variation, electric resources 112 may connect with the Internet by a different medium than the same power wire that connects them to the power grid 114. For example, a given electric resource 112 may have its own wireless capability to connect directly with the Internet 104 and thereby with the flow control center 102.

Electric resources 112 of the exemplary power aggregation system 100 may include the batteries of electric vehicles connected to the power grid 114 at residences 124, parking lots 126 etc.; batteries in a repository 128, fuel cell generators, private dams, conventional power plants, and other resources that produce electricity and/or store electricity physically or electrically.

In one implementation, each participating electric resource 112 or group of local resources has a corresponding remote intelligent power flow (IPF) module 134 (hereinafter, "remote IPF module" 134). The centralized flow control center 102 administers the power aggregation system 100 by communicating with the remote IPF modules 134 distributed peripherally among the electric resources 112. The remote IPF modules 134 perform several different functions, including providing the flow control center 102 with the statuses of remote resources; controlling the amount, direction, and timing of power being transferred into or out of a remote electric resource 112; provide metering of power being transferred into or out of a remote electric resource 112; providing safety measures during power transfer and changes of conditions in the power grid 114; logging activities; and providing self-contained control of power transfer and safety measures when communication with the flow control center 102 is interrupted. The remote IPF modules 134 will be described in greater detail below.

Figure 2:
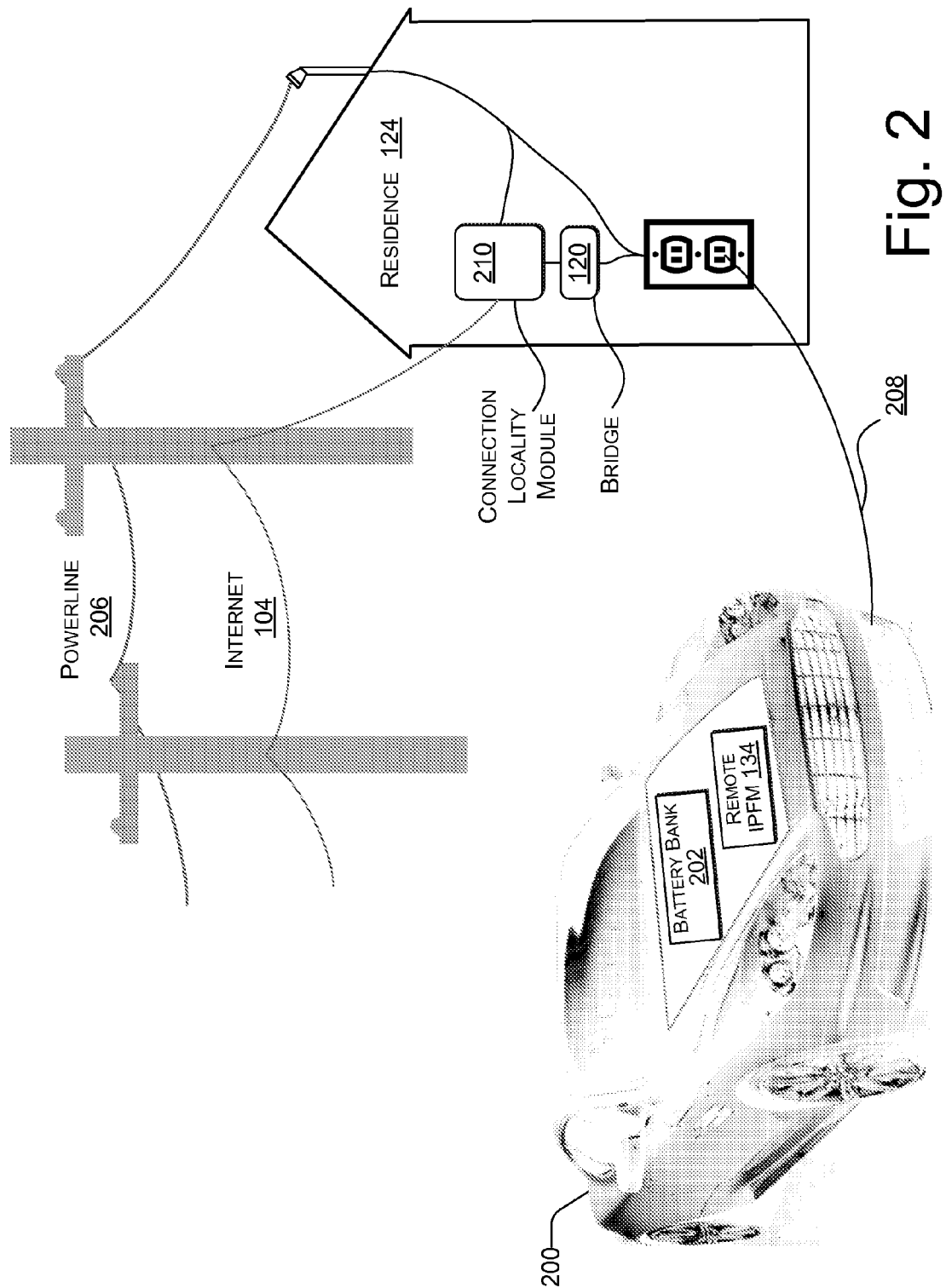
FIG. 2 is a diagram of exemplary connections between an electric vehicle, the power grid, and the Internet.

FIG. 2 shows another view of exemplary electrical and communicative connections to an electric resource 112. In this example, an electric vehicle 200 includes a battery bank 202 and an exemplary remote IPF module 134. The electric vehicle 200 may connect to a conventional wall receptacle (wall outlet) 204 of a residence 124, the wall receptacle 204 representing the peripheral edge of the power grid 114 connected via a residential powerline 206.

In one implementation, the power cord 208 between the electric vehicle 200 and the wall outlet 204 can be composed of only conventional wire and insulation for conducting alternating current (AC) power to and from the electric vehicle 200. In FIG. 2, a location-specific connection locality module 210 performs the function of network access point—in this case, the Internet access point. A bridge 120 intervenes between the receptacle 204 and the network access point so that the power cord 208 can also carry network communications between the electric vehicle 200 and the receptacle 204. With such a bridge 120 and connection locality module 210 in place in a connection location, no other special wiring or physical medium is needed to communicate with the remote IPF module 134 of the electric vehicle 200 other than a conventional power cord 208 for providing residential line current at conventional voltage. Upstream of the connection locality module 210, power and communication with the electric vehicle 200 are resolved into the powerline 206 and an Internet cable 104.

Alternatively, the power cord 208 may include safety features not found in conventional power and extension cords. For example, an electrical plug 212 of the power cord 208 may include electrical and/or mechanical safeguard components to prevent the remote IPF module 134 from electrifying or exposing the male conductors of the power cord 208 when the conductors are exposed to a human user.

Figure 3:
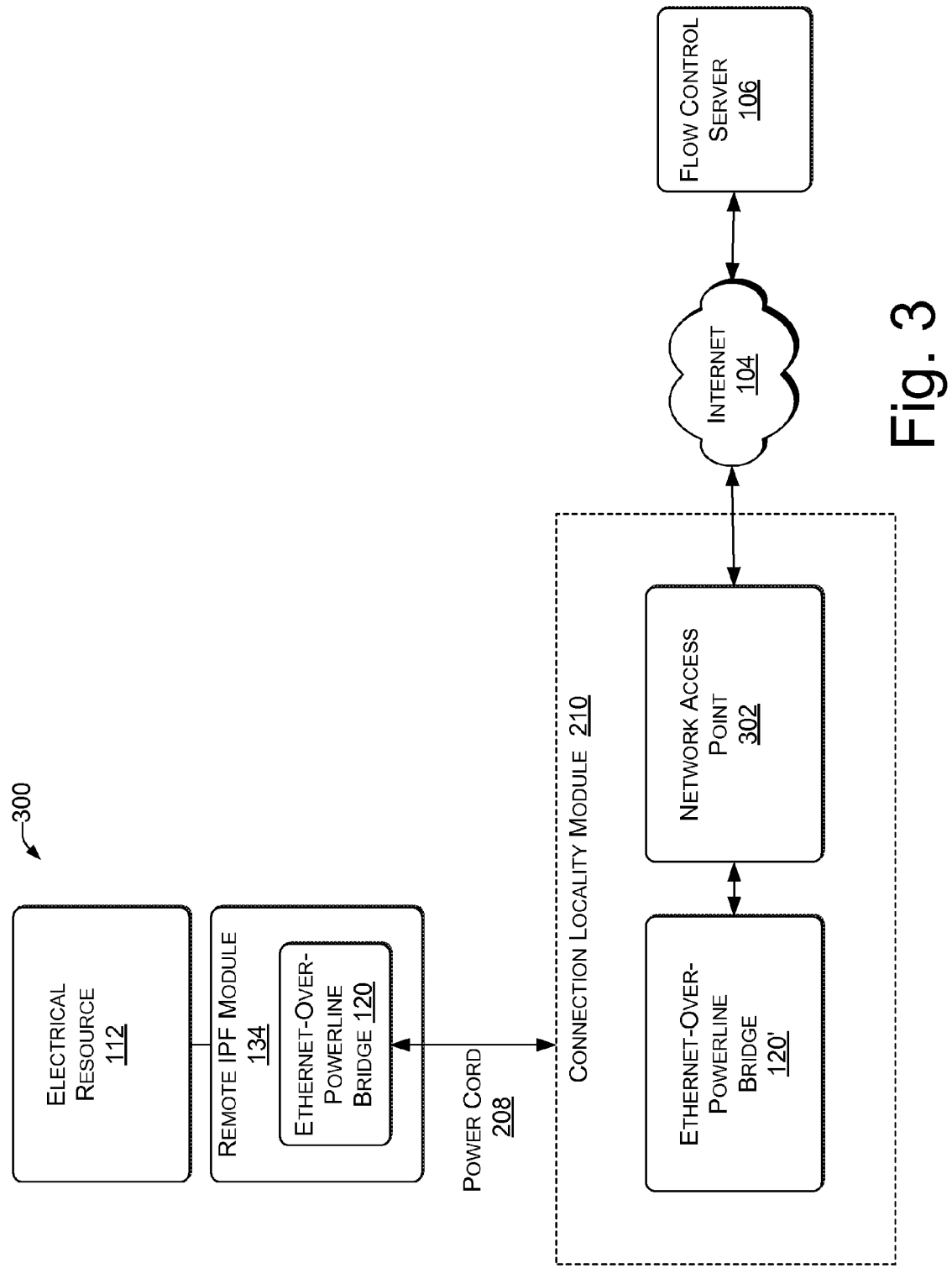
FIG. 3 is a block diagram of exemplary connections between an electric resource and a flow control server of the power aggregation system.

FIG. 3 shows exemplary connections 300 between an electric resource 112 and a flow control server 106 of another implementation of the connection locality module 210 of FIG. 2, in greater detail. In FIG. 3, an electric resource 112 has an associated remote IFF module 134, including a bridge 120. The power cord 208 connects the electric resource 112 to the power grid 114 and also to the connection locality module 210 in order to communicate with the flow control server 106.

The connection locality module 210 includes another instance of a bridge 120', connected to a network access point 302, which may include such components as a router, switch, and/or modem, to establish a hardwired or wireless connection with, in this case, the Internet 104. In one implementation, the power cord 208 between the two bridges 120 and 120' is replaced by a wireless Internet link, such as a wireless transceiver in the remote IPF module 134 and a wireless router in the connection locality module 210.

Exemplary System Layouts

Figure 4:
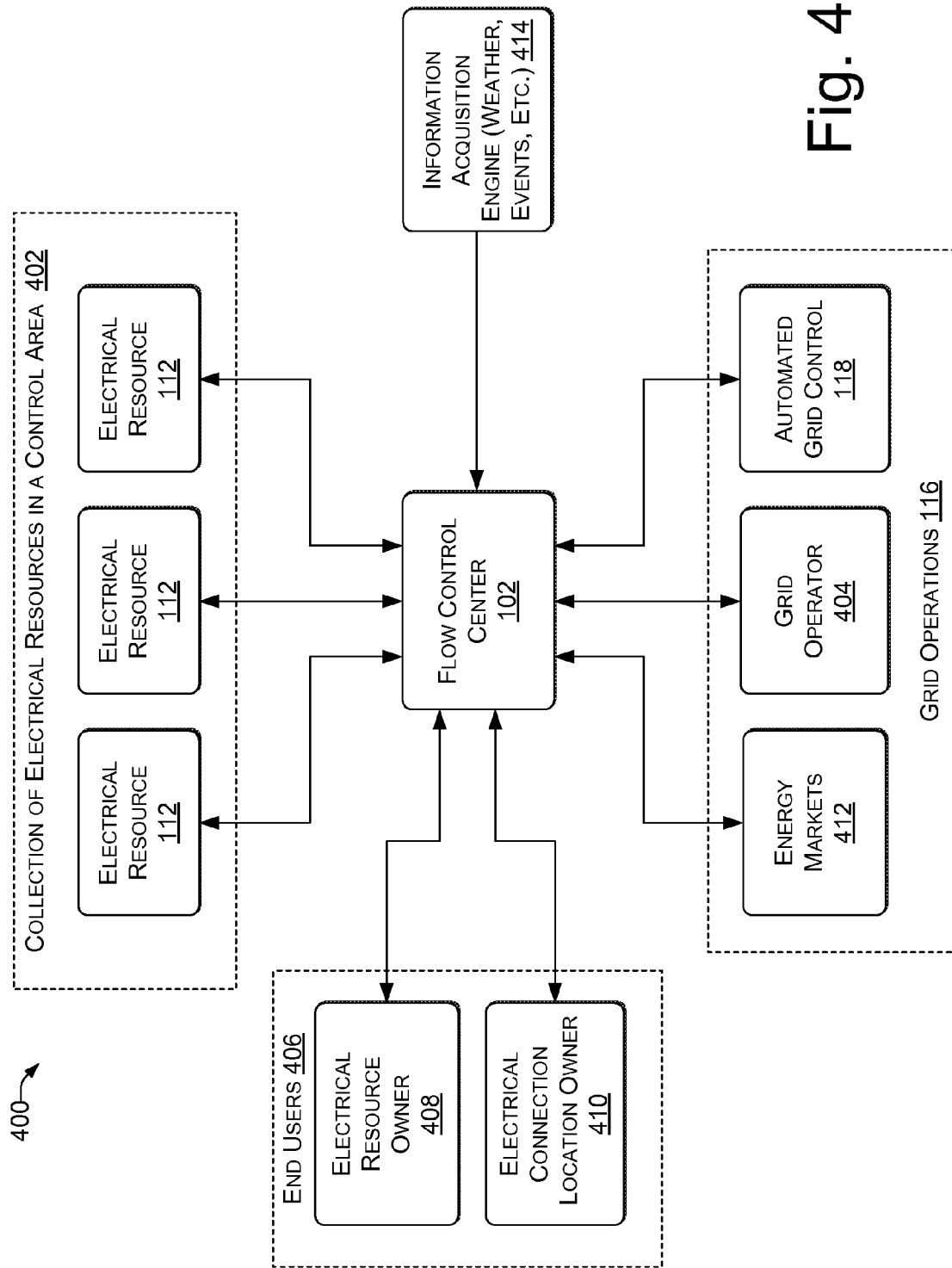
FIG. 4 is a diagram of an exemplary layout of the power aggregation system.

FIG. 4 shows an exemplary layout 400 of the power aggregation system 100. The flow control center 102 can be connected to many different entities, e.g., via the Internet 104, for communicating and receiving information. The exemplary layout 400 includes electric resources 112, such as plug-in electric vehicles 200, physically connected to the grid within a single control area 402. The electric resources 112 become an energy resource for grid operators 404 to utilize.

The exemplary layout 400 also includes end users 406 classified into electric resource owners 408 and electrical connection location owners 410, who may or may not be one and the same. In fact, the stakeholders in an exemplary power aggregation system 100 include the system operator at the flow control center 102, the grid operator 404, the resource owner 408, and the owner of the location 410 at which the electric resource 112 is connected to the power grid 114.

Electrical connection location owners 410 can include:

Rental car lots—rental car companies often have a large portion of their fleet parked in the lot. They can purchase fleets of electric vehicles 200 and, participating in a power aggregation system 100, generate revenue from idle fleet vehicles.

Public parking lots—parking lot owners can participate in the power aggregation system 100 to generate revenue from parked electric vehicles 200. Vehicle owners can be offered free parking, or additional incentives, in exchange for providing power services.

Workplace parking—employers can participate in a power aggregation system 100 to generate revenue from parked employee electric vehicles 200. Employees can be offered incentives in exchange for providing power services.

Residences—a home garage can merely be equipped with a connection locality module 210 to enable the homeowner to participate in the power aggregation system 100 and generate revenue from a parked car. Also, the vehicle battery 202 and associated power electronics within the vehicle can provide local power backup power during times of peak load or power outages.

Residential neighborhoods—neighborhoods can participate in a power aggregation system 100 and be equipped with power-delivery devices (deployed, for example, by homeowner cooperative groups) that generate revenue from parked electric vehicles 200.

The grid operations 116 of FIG. 4 collectively include interactions with energy markets 412, the interactions of grid operators 404, and the interactions of automated grid controllers 118 that perform automatic physical control of the power grid 114.

The flow control center 102 may also be coupled with information sources 414 for input of weather reports, events, price feeds, etc. Other data sources 414 include the system stakeholders, public databases, and historical system data, which may be used to optimize system performance and to satisfy constraints on the exemplary power aggregation system 100.

Thus, an exemplary power aggregation system 100 may consist of components that:

communicate with the electric resources 112 to gather data and actuate charging/discharging of the electric resources 112;
gather real-time energy prices;
gather real-time resource statistics;
predict behavior of electric resources 112 (connectedness, location, state (such as battery State-Of-Charge) at time of connect/disconnect);
predict behavior of the power grid 114/load;
encrypt communications for privacy and data security;
actuate charging of electric vehicles 200 to optimize some figure(s) of merit;
offer guidelines or guarantees about load availability for various points in the future, etc.

These components can be running on a single computing resource (computer, etc.), or on a distributed set of resources (either physically co-located or not).

Exemplary IPF systems 100 in such a layout 400 can provide many benefits: for example, lower-cost ancillary services (i.e., power services), fine-grained (both temporally and spatially) control over resource scheduling, guaranteed reliability and service levels, increased service levels via intelligent resource scheduling, firming of intermittent generation sources such as wind and solar power generation.

The exemplary power aggregation system 100 enables a grid operator 404 to control the aggregated electric resources 112 connected to the power grid 114. An electric resource 112 can act as a power source, load, or storage, and the resource 112 may exhibit combinations of these properties. Control of an electric resource 112 is the ability to actuate power consumption, generation, or energy storage from an aggregate of these electric resources 112.

Figure 5:
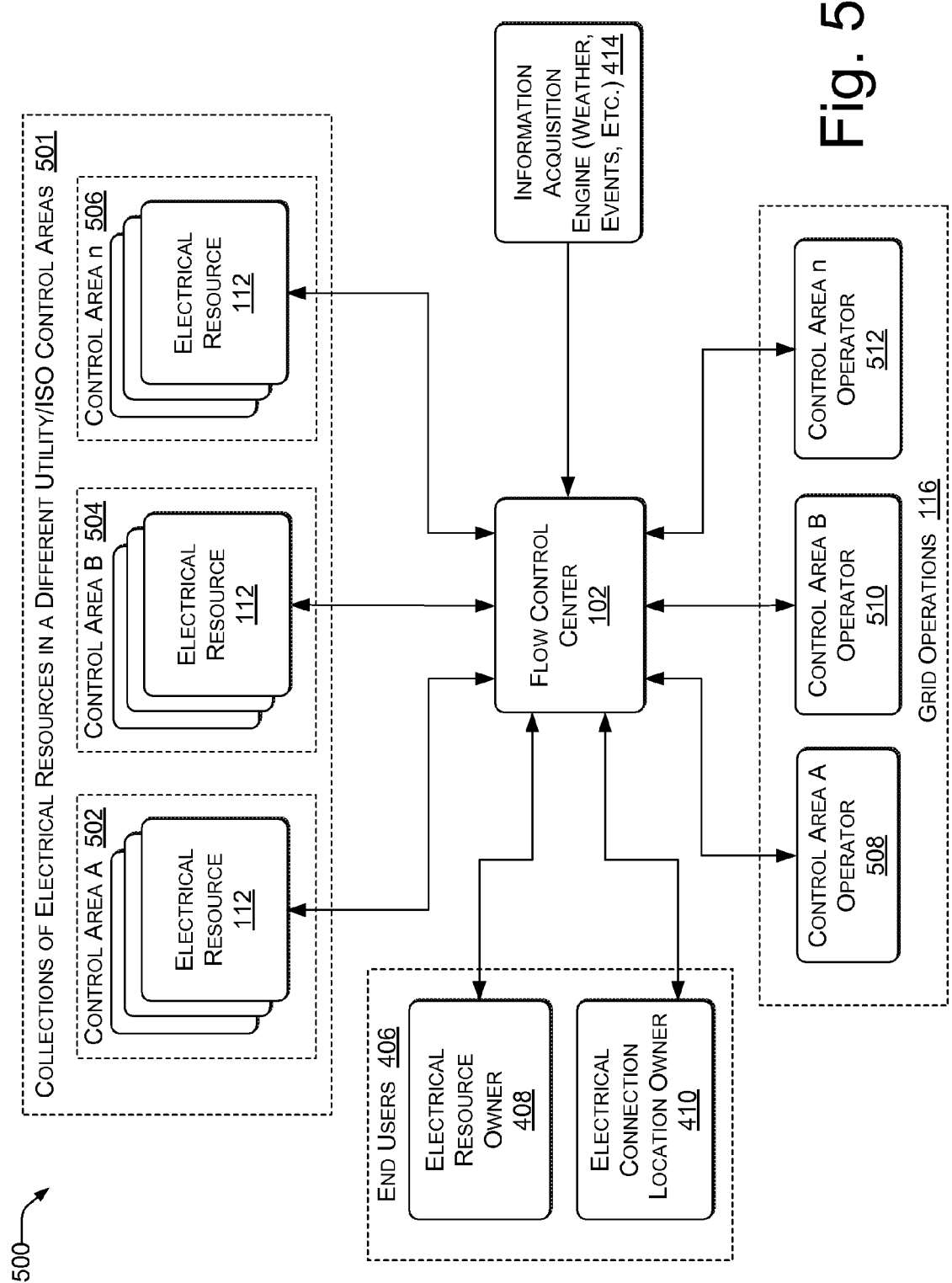
FIG. 5 is a diagram of exemplary control areas in the power aggregation system.

FIG. 5 shows exemplary control areas 500 and the role of multiple control areas 402 in the exemplary power aggregation system 100. Each electric resource 112 can be connected to the power aggregation system 100 within a specific electrical control area. A single instance of the flow control center 102 can administer electric resources 112 from multiple distinct control areas 501 (e.g., control areas 502, 504, and 506). In one implementation, this functionality is achieved by logically partitioning resources within the power aggregation system 100. For example, when the control areas 402 include an arbitrary number of control areas, control area "A" 502, control area "B" 504, . . . , control area "n" 506, then grid operations 116 can include corresponding control area operators 508, 510, . . . , and 512. Further division into a control hierarchy that includes control division groupings above and below the illustrated control areas 402 allows the power aggregation system 100 to scale to power grids 114 of different magnitudes and/or to varying numbers of electric resources 112 connected with a power grid 114.

Figure 6:
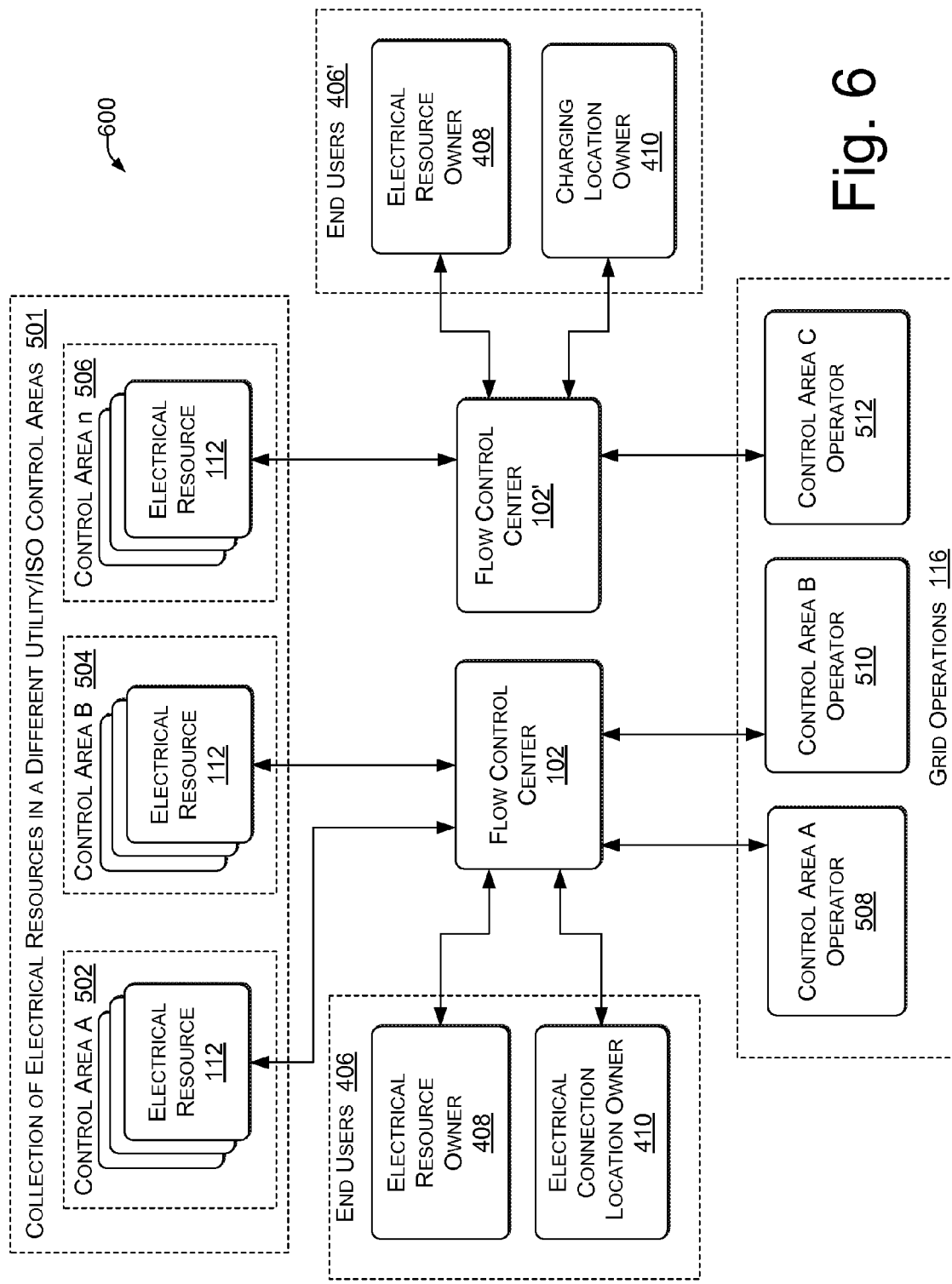
FIG. 6 is a diagram of multiple flow control centers in the power aggregation system.

FIG. 6 shows an exemplary layout 600 of an exemplary power aggregation system 100 that uses multiple centralized flow control centers 102 and 102'. Each flow control center 102 and 102' has its own respective end users 406 and 406'. Control areas 402 to be administered by each specific instance of a flow control center 102 can be assigned dynamically. For example, a first flow control center 102 may administer control area A 502 and control area B 504, while a second flow control center 102' administers control area n 506. Likewise, corresponding control area operators (508, 510, and 512) are served by the same flow control center 102 that serves their respective different control areas.

Exemplary Flow Control Server

Figure 7:
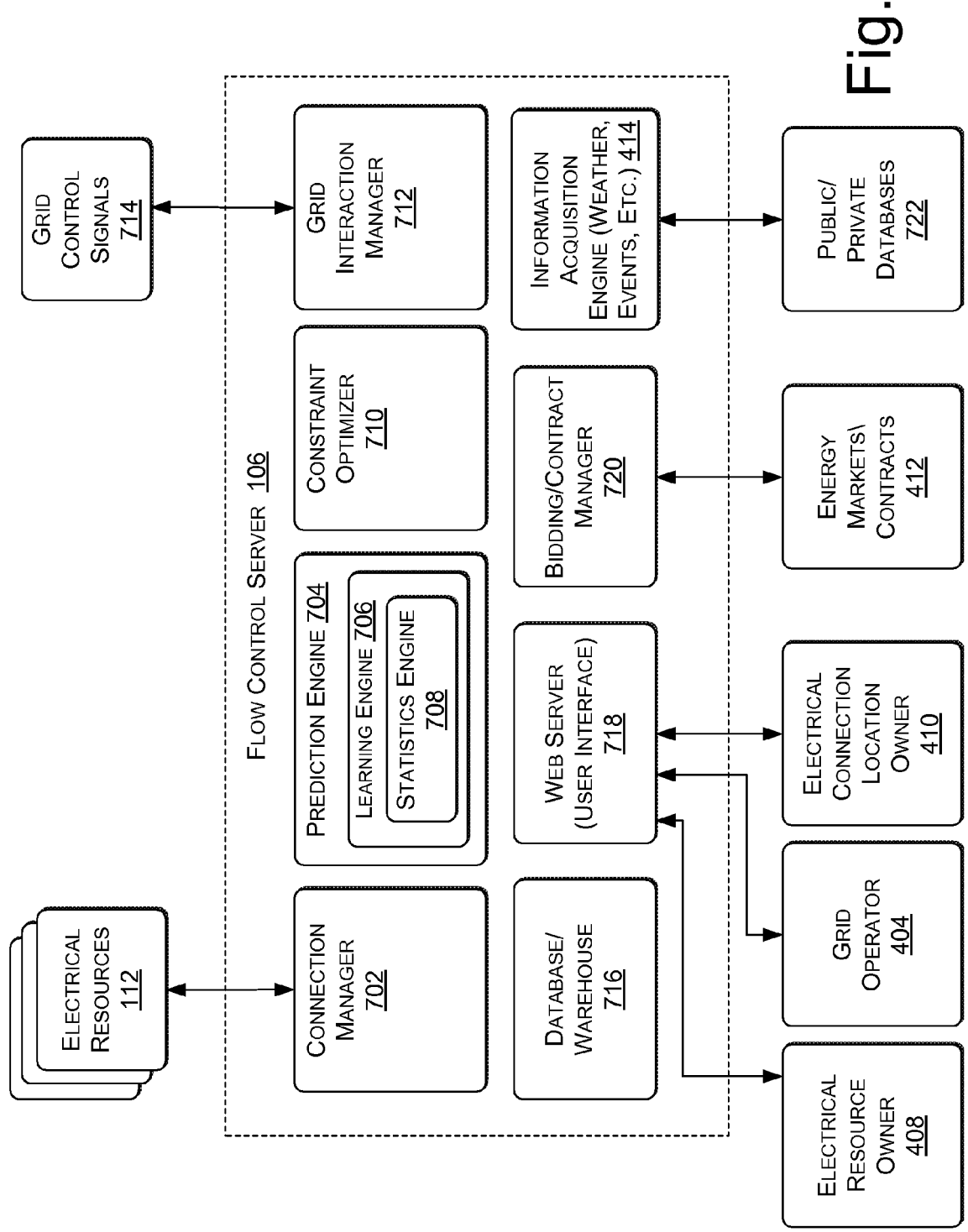
FIG. 7 is a block diagram of an exemplary flow control server.

FIG. 7 shows an exemplary server 106 of the flow control center 102. The illustrated implementation in FIG. 7 is only one example configuration, for descriptive purposes. Many other arrangements of the illustrated components or even different components constituting an exemplary server 106 of the flow control center 102 are possible within the scope of the subject matter. Such an exemplary server 106 and flow control center 102 can be executed in hardware, software, or combinations of hardware, software, firmware, etc.

The exemplary flow control server 106 includes a connection manager 702 to communicate with electric resources 112, a prediction engine 704 that may include a learning engine 706 and a statistics engine 708, a constraint optimizer 710, and a grid interaction manager 712 to receive grid control signals 714. Grid control signals 714 are sometimes referred to as generation control signals, such as automated generation control (AGC) signals. The flow control server 106 may further include a database/information warehouse 716, a web server 718 to present a user interface to electric resource owners 408, grid operators 404, and electrical connection location owners 410; a contract manager 720 to negotiate contract terms with energy markets 412, and an information acquisition engine 414 to track weather, relevant news events, etc., and download information from public and private databases 722 for predicting behavior of large groups of the electric resources 112, monitoring energy prices, negotiating contracts, etc.

Operation of an Exemplary Flow Control Server

The connection manager 702 maintains a communications channel with each electric resource 112 that is connected to the power aggregation system 100. That is, the connection manager 702 allows each electric resource 112 to log on and communicate, e.g., using Internet Protocol (IP) if the network is the Internet 104. In other words, the electric resources 112 call home. That is, in one implementation they always initiate the connection with the server 106. This facet enables the exemplary IPF modules 134 to work around problems with firewalls, IP addressing, reliability, etc.

For example, when an electric resource 112, such as an electric vehicle 200 plugs in at home 124, the IPF module 134 can connect to the home's router via the powerline connection. The router will assign the vehicle 200 an address (DHCP), and the vehicle 200 can connect to the server 106 (no holes in the firewall needed from this direction).

If the connection is terminated for any reason (including the server instance dies), then the IPF module 134 knows to call home again and connect to the next available server resource.

The grid interaction manager 712 receives and interprets signals from the interface of the automated grid controller 118 of a grid operator 404. In one implementation, the grid interaction manager 712 also generates signals to send to automated grid controllers 118. The scope of the signals to be sent depends on agreements or contracts between grid operators 404 and the exemplary power aggregation system 100. In one scenario the grid interaction manager 712 sends information about the availability of aggregate electric resources 112 to receive power from the grid 114 or supply power to the grid 114. In another variation, a contract may allow the grid interaction manager 712 to send control signals to the automated grid controller 118—to control the grid 114, subject to the built-in constraints of the automated grid controller 118 and subject to the scope of control allowed by the contract.

The database 716 can store all of the data relevant to the power aggregation system 100 including electric resource logs, e.g., for electric vehicles 200, electrical connection information, per-vehicle energy metering data, resource owner preferences, account information, etc.

The web server 718 provides a user interface to the system stakeholders, as described above. Such a user interface serves primarily as a mechanism for conveying information to the users, but in some cases, the user interface serves to acquire data, such as preferences, from the users. In one implementation, the web server 718 can also initiate contact with participating electric resource owners 408 to advertise offers for exchanging electrical power.

The bidding/contract manager 720 interacts with the grid operators 404 and their associated energy markets 412 to determine system availability, pricing, service levels, etc.

The information acquisition engine 414 communicates with public and private databases 722, as mentioned above, to gather data that is relevant to the operation of the power aggregation system 100.

The prediction engine 704 may use data from the data warehouse 716 to make predictions about electric resource behavior, such as when electric resources 112 will connect and disconnect, global electric resource availability, electrical system load, real-time energy prices, etc. The predictions enable the power aggregation system 100 to utilize more fully the electric resources 112 connected to the power grid 114. The learning engine 706 may track, record, and process actual electric resource behavior, e.g., by learning behavior of a sample or cross-section of a large population of electric resources 112. The statistics engine 708 may apply various probabilistic techniques to the resource behavior to note trends and make predictions.

In one implementation, the prediction engine 704 performs predictions via collaborative filtering. The prediction engine 704 can also perform per-user predictions of one or more parameters, including, for example, connect-time, connect duration, state-of-charge at connect time, and connection location. In order to perform per-user prediction, the prediction engine 704 may draw upon information, such as historical data, connect time (day of week, week of month, month of year, holidays, etc.), state-of-charge at connect, connection location, etc. In one implementation, a time series prediction can be computed via a recurrent neural network, a dynamic Bayesian network, or other directed graphical model.

In one scenario, for one user disconnected from the grid 114, the prediction engine 704 can predict the time of the next connection, the state-of-charge at connection time, the location of the connection (and may assign it a probability/likelihood). Once the resource 112 has connected, the time-of-connection, state-of-charge at-connection, and connection location become further inputs to refinements of the predictions of the connection duration. These predictions help to guide predictions of total system availability as well as to determine a more accurate cost function for resource allocation.

Building a parameterized prediction model for each unique user is not always scalable in time or space. Therefore, in one implementation, rather than use one model for each user in the system 100, the prediction engine 704 builds a reduced set of models where each model in the reduced set is used to predict the behavior of many users. To decide how to group similar users for model creation and assignment, the system 100 can identify features of each user, such as number of unique connections/disconnections per day, typical connection time(s), average connection duration, average state-of-charge at connection time, etc., and can create clusters of users in either a full feature space or in some reduced feature space that is computed via a dimensionality reduction algorithm such as Principal Components Analysis, Random Projection, etc. Once the prediction engine 704 has assigned users to a cluster, the collective data from all of the users in that cluster is used to create a predictive model that will be used for the predictions of each user in the cluster. In one implementation, the cluster assignment procedure is varied to optimize the system 100 for speed (less clusters), for accuracy (more clusters), or some combination of the two.

This exemplary clustering technique has multiple benefits. First, it enables a reduced set of models, and therefore reduced model parameters, which reduces the computation time for making predictions. It also reduces the storage space of the model parameters. Second, by identifying traits (or features) of new users to the system 100, these new users can be assigned to an existing cluster of users with similar traits, and the cluster model, built from the extensive data of the existing users, can make more accurate predictions about the new user more quickly because it is leveraging the historical performance of similar users. Of course, over time, individual users may change their behaviors and may be reassigned to new clusters that fit their behavior better.

The constraint optimizer 710 combines information from the prediction engine 704, the data warehouse 716, and the contract manager 720 to generate resource control signals that will satisfy the system constraints. For example, the constraint optimizer 710 can signal an electric vehicle 200 to charge its battery bank 202 at a certain charging rate and later to discharge the battery bank 202 for uploading power to the power grid 114 at a certain upload rate: the power transfer rates and the timing schedules of the power transfers optimized to fit the tracked individual connect and disconnect behavior of the particular electric vehicle 200 and also optimized to fit a daily power supply and demand "breathing cycle" of the power grid 114.

In one implementation, the constraint optimizer 710 plays a key role in converting generation control signals 714 into vehicle control signals, mediated by the connection manager 702. Mapping generation control signals 714 from a grid operator 404 into control signals that are sent to each unique electrical resource 112 in the system 100 is an example of a specific constraint optimization problem.

Each resource 112 has associated constraints, either hard or soft. Examples of resource constraints may include: price sensitivity of the owner, vehicle state-of-charge (e.g., if the vehicle 200 is fully charged, it cannot participate in loading the grid 114), predicted amount of time until the resource 112 disconnects from the system 100, owner sensitivity to revenue versus state-of-charge, electrical limits of the resource 114, manual charging overrides by resource owners 408, etc. The constraints on a particular resource 112 can be used to assign a cost for activating each of the resource's particular actions. For example, a resource whose storage system 202 has little energy stored in it will have a low cost associated with the charging operation, but a very high cost for the generation operation. A fully charged resource 112 that is predicted to be available for ten hours will have a lower cost generation operation than a fully charged resource 112 that is predicted to be disconnected within the next 15 minutes, representing the negative consequence of delivering a less-than-full resource to its owner.

The following is one example scenario of converting one generating signal 714 that comprises a system operating level (e.g. −10 megawatts to +10 megawatts, where + represents load, − represents generation) to a vehicle control signal. It is worth noting that because the system 100 can meter the actual power flows in each resource 112, the actual system operating level is known at all times.

In this example, assume the initial system operating level is 0 megawatts, no resources are active (taking or delivering power from the grid), and the negotiated aggregation service contract level for the next hour is +/−5 megawatts.

In this implementation, the exemplary power aggregation system 100 maintains three lists of available resources 112. The first list contains resources 112 that can be activated for charging (load) in priority order. There is a second list of resources 112 ordered by priority for discharging (generation). Each of the resources 112 in these lists (e.g., all resources 112 can have a position in both lists) have an associated cost. The priority order of the lists is directly related to the cost (i.e., the lists are sorted from lowest cost to highest cost). Assigning cost values to each resource 112 is important because it enables the comparison of two operations that achieve similar results with respect to system operation. For example, adding one unit of charging (load, taking power from the grid) to the system is equivalent to removing one unit of generation. To perform any operation that increases or decreases the system output, there may be multiple action choices and in one implementation the system 100 selects the lowest cost operation. The third list of resources 112 contains resources with hard constraints. For example, resources whose owner's 408 have overridden the system 100 to force charging will be placed on the third list of static resources.

At time "1," the grid-operator-requested operating level changes to +2 megawatts. The system activates charging the first 'n' resources from the list, where 'n' is the number of resources whose additive load is predicted to equal 2 megawatts. After the resources are activated, the result of the activations are monitored to determine the actual result of the action. If more than 2 megawatts of load is active, the system will disable charging in reverse priority order to maintain system operation within the error tolerance specified by the contract.

From time "1" until time "2," the requested operating level remains constant at 2 megawatts. However, the behavior of some of the electrical resources may not be static. For example, some vehicles 200 that are part of the 2 megawatts system operation may become full (state-of-charge=100%) or may disconnect from the system 100. Other vehicles 200 may connect to the system 100 and demand immediate charging. All of these actions will cause a change in the operating level of the power aggregation system 100. Therefore, the system 100 continuously monitors the system operating level and activates or deactivates resources 112 to maintain the operating level within the error tolerance specified by the contract.

At time "2," the grid-operator-requested operating level decreases to −1 megawatts. The system consults the lists of available resources and chooses the lowest cost set of resources to achieve a system operating level of −1 megawatts. Specifically, the system moves sequentially through the priority lists, comparing the cost of enabling generation versus disabling charging, and activating the lowest cost resource at each time step. Once the operating level reaches −1 megawatts, the system 100 continues to monitor the actual operating level, looking for deviations that would require the activation of an additional resource 112 to maintain the operating level within the error tolerance specified by the contract.

In one implementation, an exemplary costing mechanism is fed information on the real-time grid generation mix to determine the marginal consequences of charging or generation (vehicle 200 to grid 114) on a "carbon footprint," the impact on fossil fuel resources and the environment in general. The exemplary system 100 also enables optimizing for any cost metric, or a weighted combination of several. The system 100 can optimize figures of merit that may include, for example, a combination of maximizing economic value and minimizing environmental impact, etc.

In one implementation, the system 100 also uses cost as a temporal variable. For example, if the system 100 schedules a discharged pack to charge during an upcoming time window, the system 100 can predict its look-ahead cost profile as it charges, allowing the system 100 to further optimize, adaptively. That is, in some circumstances the system 100 knows that it will have a high-capacity generation resource by a certain future time.

Multiple components of the flow control server 106 constitute a scheduling system that has multiple functions and components:

- data collection (gathers real-time data and stores historical data);
- projections via the prediction engine 704, which inputs real-time data, historical data, etc.; and outputs resource availability forecasts;
- optimizations built on resource availability forecasts, constraints, such as command signals from grid operators 404, user preferences, weather conditions, etc. The optimizations can take the form of resource control plans that optimize a desired metric.

The scheduling function can enable a number of useful energy services, including:

- ancillary services, such as rapid response services and fast regulation;
- energy to compensate for sudden, foreseeable, or unexpected grid imbalances;
- response to routine and unstable demands;
- firming of renewable energy sources (e.g. complementing wind-generated power).

An exemplary power aggregation system 100 aggregates and controls the load presented by many charging/uploading electric vehicles 200 to provide power services (ancillary energy services) such as regulation and spinning reserves. Thus, it is possible to meet call time requirements of grid operators 404 by summing multiple electric resources 112. For example, twelve operating loads of 5 kW each can be disabled to provide 60 kW of spinning reserves for one hour. However, if each load can be disabled for at most 30 minutes and the minimum call time is two hours, the loads can be disabled in series (three at a time) to provide 15 kW of reserves for two hours. Of course, more complex interleavings of individual electric resources by the power aggregation system 100 are possible.

For a utility (or electrical power distribution entity) to maximize distribution efficiency, the utility needs to minimize reactive power flows. Typically, there are a number of methods used to minimize reactive power flows including switching inductor or capacitor banks into the distribution system to modify the power factor in different parts of the system. To manage and control this dynamic Volt-Amperes Reactive (VAR) support effectively, it must be done in a location-aware manner. In one implementation, the power aggregation system 100 includes power-factor correction circuitry placed in electric vehicles 200 with the exemplary remote IPF module 134, thus enabling such a service. Specifically, the electric vehicles 200 can have capacitors (or inductors) that can be dynamically connected to the grid, independent of whether the electric vehicle 200 is charging, delivering power, or doing nothing. This service can then be sold to utilities for distribution level dynamic VAR support. The power aggregation system 100 can both sense the need for VAR support in a distributed manner and use the distributed remote IPF modules 134 to take actions that provide VAR support without grid operator 404 intervention.

Exemplary Remote IPF Module

Figure 8:
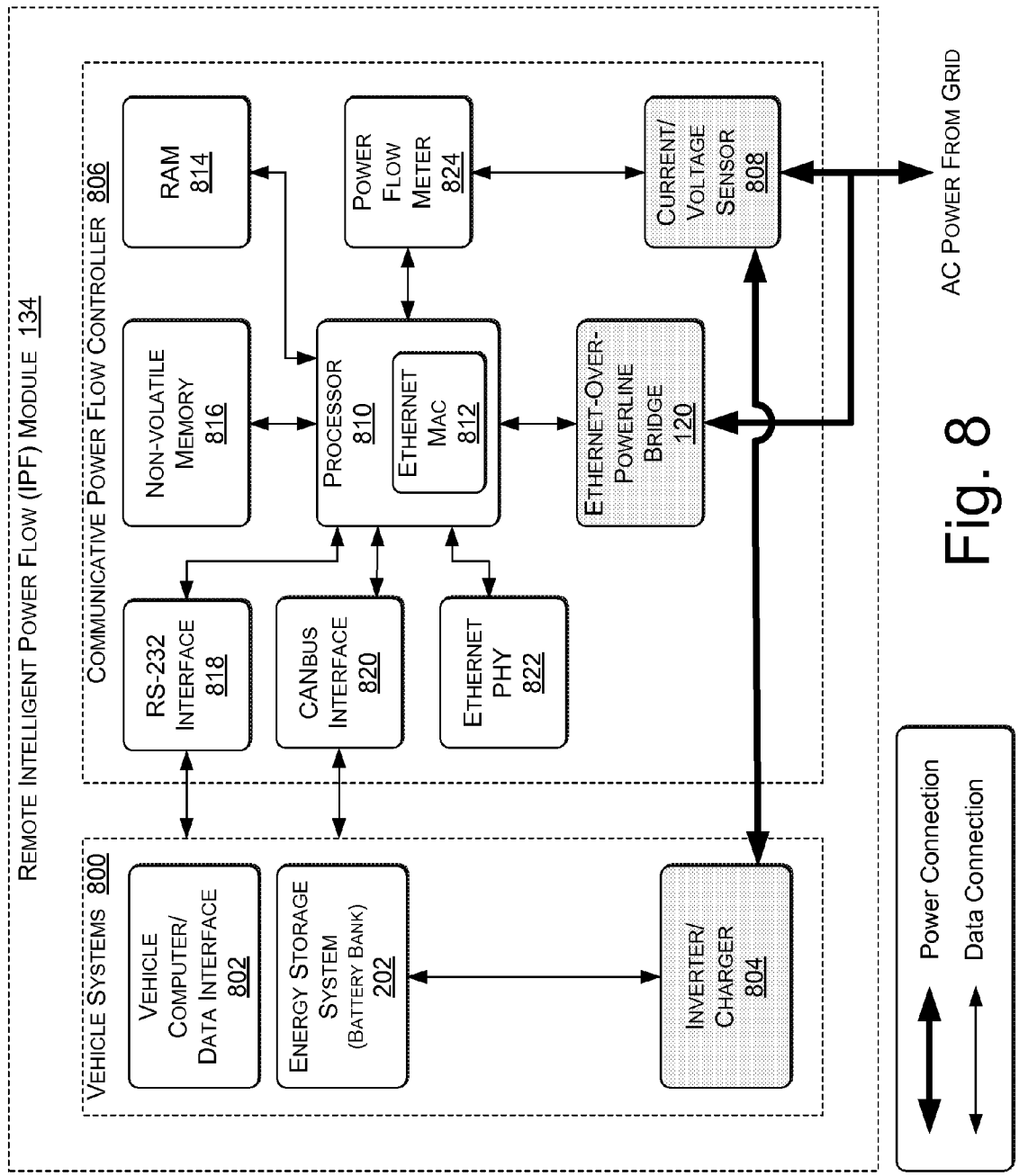
FIG. 8 is block diagram of an exemplary remote intelligent power flow module.

FIG. 8 shows the remote IPF module 134 of FIGS. 1 and 2 in greater detail. The illustrated remote IPF module 134 is only one example configuration, for descriptive purposes. Many other arrangements of the illustrated components or even different components constituting an exemplary remote IPF module 134 are possible within the scope of the subject matter. Such an exemplary remote IPF module 134 has some hardware components and some components that can be executed in hardware, software, or combinations of hardware, software, firmware, etc.

The illustrated example of a remote IPF module 134 is represented by an implementation suited for an electric vehicle 200. Thus, some vehicle systems 800 are included as part of the exemplary remote IPF module 134 for the sake of description. However, in other implementations, the remote IPF module 134 may exclude some or all of the vehicles systems 800 from being counted as components of the remote IPF module 134.

The depicted vehicle systems 800 include a vehicle computer and data interface 802, an energy storage system, such as a battery bank 202, and an inverter/charger 804. Besides vehicle systems 800, the remote IPF module 134 also includes a communicative power flow controller 806. The communicative power flow controller 806 in turn includes some components that interface with AC power from the grid 114, such as a powerline communicator, for example an Ethernet-over-powerline bridge 120, and a current or current/voltage (power) sensor 808, such as a current sensing transformer.

The communicative power flow controller 806 also includes Ethernet and information processing components, such as a processor 810 or microcontroller and an associated Ethernet media access control (MAC) address 812; volatile random access memory 814, nonvolatile memory 816 or data storage, an interface such as an RS-232 interface 818 or a CANbus interface 820; an Ethernet physical layer interface 822, which enables wiring and signaling according to Ethernet standards for the physical layer through means of network access at the MAC/Data Link Layer and a common addressing format. The Ethernet physical layer interface 822 provides electrical, mechanical, and procedural interface to the transmission medium—i.e., in one implementation, using the Ethernet-over-powerline bridge 120. In a variation, wireless or other communication channels with the Internet 104 are used in place of the Ethernet-over-powerline bridge 120.

The communicative power flow controller 806 also includes a bidirectional power flow meter 824 that tracks power transfer to and from each electric resource 112, in this case the battery bank 202 of an electric vehicle 200.

The communicative power flow controller 806 operates either within, or connected to an electric vehicle 200 or other electric resource 112 to enable the aggregation of electric resources 112 introduced above (e.g., via a wired or wireless communication interface). These above-listed components may vary among different implementations of the communicative power flow controller 806, but implementations typically include:

- an intra-vehicle communications mechanism that enables communication with other vehicle components;
- a mechanism to communicate with the flow control center 102;
- a processing element;
- a data storage element;
- a power meter; and
- optionally, a user interface.

Implementations of the communicative power flow controller 806 can enable functionality including:

- executing pre-programmed or learned behaviors when the electric resource 112 is offline (not connected to Internet 104, or service is unavailable);
- storing locally-cached behavior profiles for "roaming" connectivity (what to do when charging on a foreign system or in disconnected operation, i.e., when there is no network connectivity);

allowing the user to override current system behavior; and
metering power-flow information and caching meter data during offline operation for later transaction.

Thus, the communicative power flow controller 806 includes a central processor 810, interfaces 818 and 820 for communication within the electric vehicle 200, a powerline communicator, such as an Ethernet-over-powerline bridge 120 for communication external to the electric vehicle 200, and a power flow meter 824 for measuring energy flow to and from the electric vehicle 200 via a connected AC powerline 208.

Operation of the Exemplary Remote IPF Module

Continuing with electric vehicles 200 as representative of electric resources 112, during periods when such an electric vehicle 200 is parked and connected to the grid 114, the remote IPF module 134 initiates a connection to the flow control server 106, registers itself, and waits for signals from the flow control server 106 that direct the remote IPF module 134 to adjust the flow of power into or out of the electric vehicle 200. These signals are communicated to the vehicle computer 802 via the data interface, which may be any suitable interface including the RS-232 interface 818 or the CANbus interface 820. The vehicle computer 802, following the signals received from the flow control server 106, controls the inverter/charger 804 to charge the vehicle's battery bank 202 or to discharge the battery bank 202 in upload to the grid 114.

Periodically, the remote IPF module 134 transmits information regarding energy flows to the flow control server 106. If, when the electric vehicle 200 is connected to the grid 114, there is no communications path to the flow control server 106 (i.e., the location is not equipped properly, or there is a network failure), the electric vehicle 200 can follow a preprogrammed or learned behavior of off-line operation, e.g., stored as a set of instructions in the nonvolatile memory 816. In such a case, energy transactions can also be cached in nonvolatile memory 816 for later transmission to the flow control server 106.

During periods when the electric vehicle 200 is in operation as transportation, the remote IPF module 134 listens passively, logging select vehicle operation data for later analysis and consumption. The remote IPF module 134 can transmit this data to the flow control server 106 when a communications channel becomes available.

Exemplary Power Flow Meter

Power is the rate of energy consumption per interval of time. Power indicates the quantity of energy transferred during a certain period of time, thus the units of power are quantities of energy per unit of time. The exemplary power flow meter 824 measures power for a given electric resource 112 across a bidirectional flow—e.g., power from grid 114 to electric vehicle 200 or from electric vehicle 200 to the grid 114. In one implementation, the remote IPF module 134 can locally cache readings from the power flow meter 824 to ensure accurate transactions with the central flow control server 106, even if the connection to the server is down temporarily, or if the server itself is unavailable.

The exemplary power flow meter 824, in conjunction with the other components of the remote IPF module 134 enables system-wide features in the exemplary power aggregation system 100 that include:

tracking energy usage on an electric resource-specific basis;

power-quality monitoring (checking if voltage, frequency, etc. deviate from their nominal operating points, and if so, notifying grid operators, and potentially modifying resource power flows to help correct the problem);

vehicle-specific billing and transactions for energy usage;

mobile billing (support for accurate billing when the electric resource owner 408 is not the electrical connection location owner 410 (i.e., not the meter account owner). Data from the power flow meter 824 can be captured at the electric vehicle 200 for billing;

integration with a smart meter at the charging location (bidirectional information exchange); and tamper resistance (e.g., when the power flow meter 824 is protected within an electric resource 112 such as an electric vehicle 200).

Mobile Resource Locator

The exemplary power aggregation system 100 also includes various techniques for determining the electrical network location of a mobile electric resource 112, such as a plug-in electric vehicle 200. Electric vehicles 200 can connect to the grid 114 in numerous locations and accurate control and transaction of energy exchange can be enabled by specific knowledge of the charging location.

Some of the exemplary techniques for determining electric vehicle charging locations include:

querying a unique identifier for the location (via wired, wireless, etc.), which can be:

the unique ID of the network hardware at the charging site;

the unique ID of the locally installed smart meter, by communicating with the meter;

a unique ID installed specifically for this purpose at a site; and using GPS or other signal sources (cell, WiMAX, etc.) to establish a "soft" (estimated geographic) location, which is then refined based on user preferences and historical data (e.g., vehicles tend to be plugged-in at the owner's residence 124, not a neighbor's residence).

Figure 9:
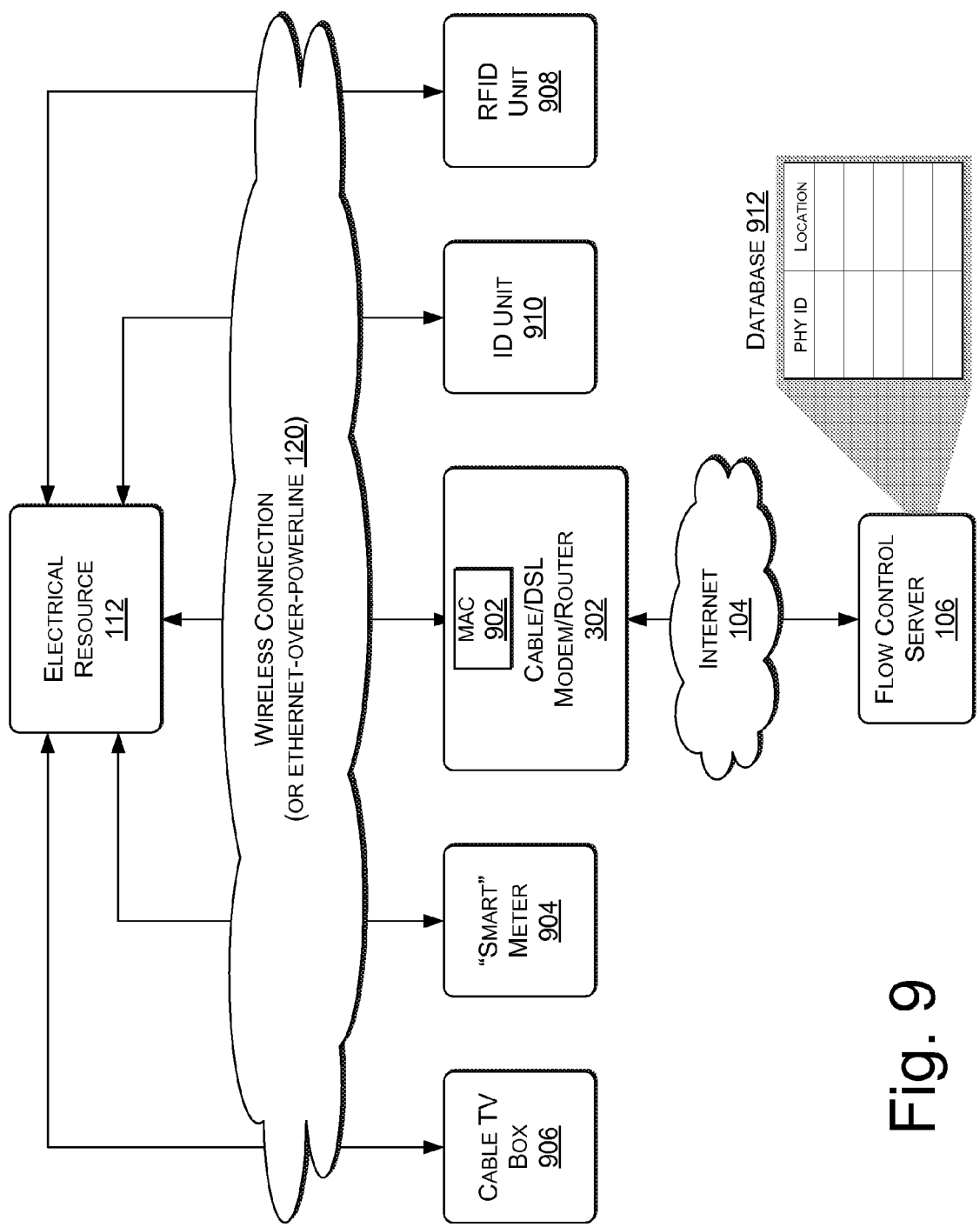
FIG. 9 is a diagram of a first exemplary technique for locating a connection location of an electric resource on a power grid.

FIG. 9 shows an exemplary technique for resolving the physical location on the grid 114 of an electric resource 112 that is connected to the exemplary power aggregation system 100. In one implementation, the remote IPF module 134 obtains the Media Access Control (MAC) address 902 of the locally installed network modem or router (Internet access point) 302. The remote IPF module 134 then transmits this unique MAC identifier to the flow control server 106, which uses the identifier to resolve the location of the electric vehicle 200.

To discern its physical location, the remote IPF module 134 can also sometimes use the MAC addresses or other unique identifiers of other physically installed nearby equipment that can communicate with the remote IPF module 134, including a "smart" utility meter 904, a cable TV box 906, an RFID-based unit 908, or an exemplary ID unit 910 that is able to communicate with the remote IPF module 134. The ID unit 910 is described in more detail in FIG. 10. MAC addresses 902 do not always give information about the physical location of the associated piece of hardware, but in one implementation the flow control server 106 includes a tracking database 912 that relates MAC addresses or other identifiers with an associated physical location of the hardware. In this manner, a remote IPF module 134 and the flow control server 106 can find a mobile electric resource 112 wherever it connects to the power grid 114.

Figure 10:
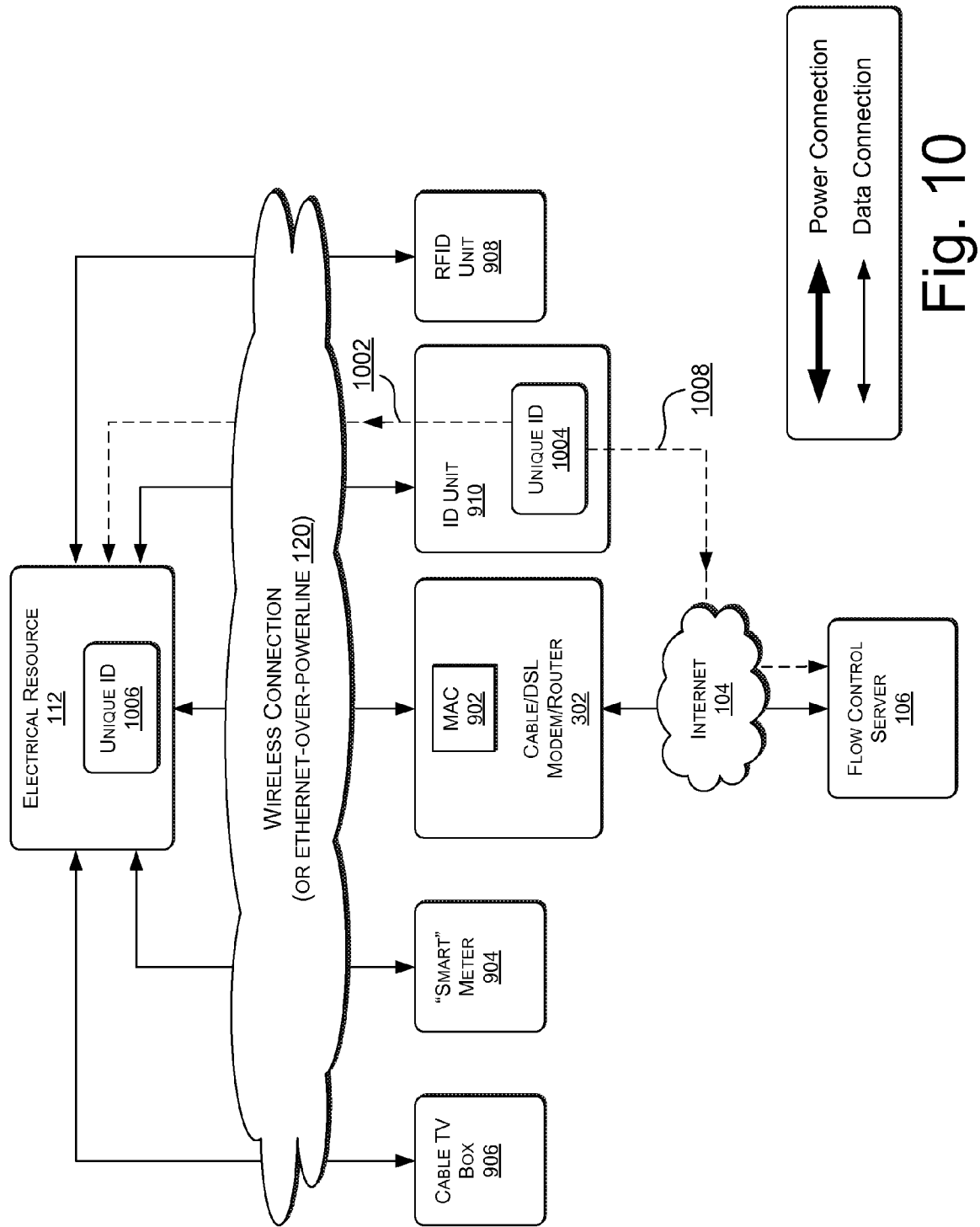
FIG. 10 is a diagram of a second exemplary technique for locating a connection location of an electric resource on the power grid.

FIG. 10 shows another exemplary technique for determining a physical location of a mobile electric resource 112 on the power grid 114. An exemplary ID unit 910 can be plugged into the grid 114 at or near a charging location. The operation of the ID unit 910 is as follows. A newly-connected electric resource 112 searches for locally connected resources by broadcasting a ping or message in the wireless reception area. In one implementation, the ID unit 910 responds 1002 to the ping and conveys a unique identifier 1004 of the ID unit 910 back to the electric resource 112. The remote IPF module 134 of the electric resource 112 then transmits the unique identifier 1004 to the flow control server 106, which determines the location of the ID unit 910 and by proxy, the exact or the approximate network location of the electric resource 112, depending on the size of the catchment area of the ID unit 910.

In another implementation, the newly-connected electric resource 112 searches for locally connected resources by broadcasting a ping or message that includes the unique identifier 1006 of the electric resource 112. In this implementation, the ID unit 910 does not need to trust or reuse the wireless connection, and does not respond back to the remote IPF module 134 of the mobile electric resource 112, but responds 1008 directly to the flow control server 106 with a message that contains its own unique identifier 1004 and the unique identifier 1006 of the electric resource 112 that was received in the ping message. The central flow control server 106 then associates the unique identifier 1006 of the mobile electric resource 112 with a "connected" status and uses the other unique identifier 1004 of the ID unit 910 to determine or approximate the physical location of the electric resource 112. The physical location does not have to be approximate, if a particular ID unit 910 is associated with only one exact network location. The remote IPF module 134 learns that the ping is successful when it hears back from the flow control center 106 with confirmation.

Such an exemplary ID unit 910 is particularly useful in situations in which the communications path between the electric resource 112 and the flow control server 106 is via a wireless connection that does not itself enable exact determination of network location.

Figure 11:
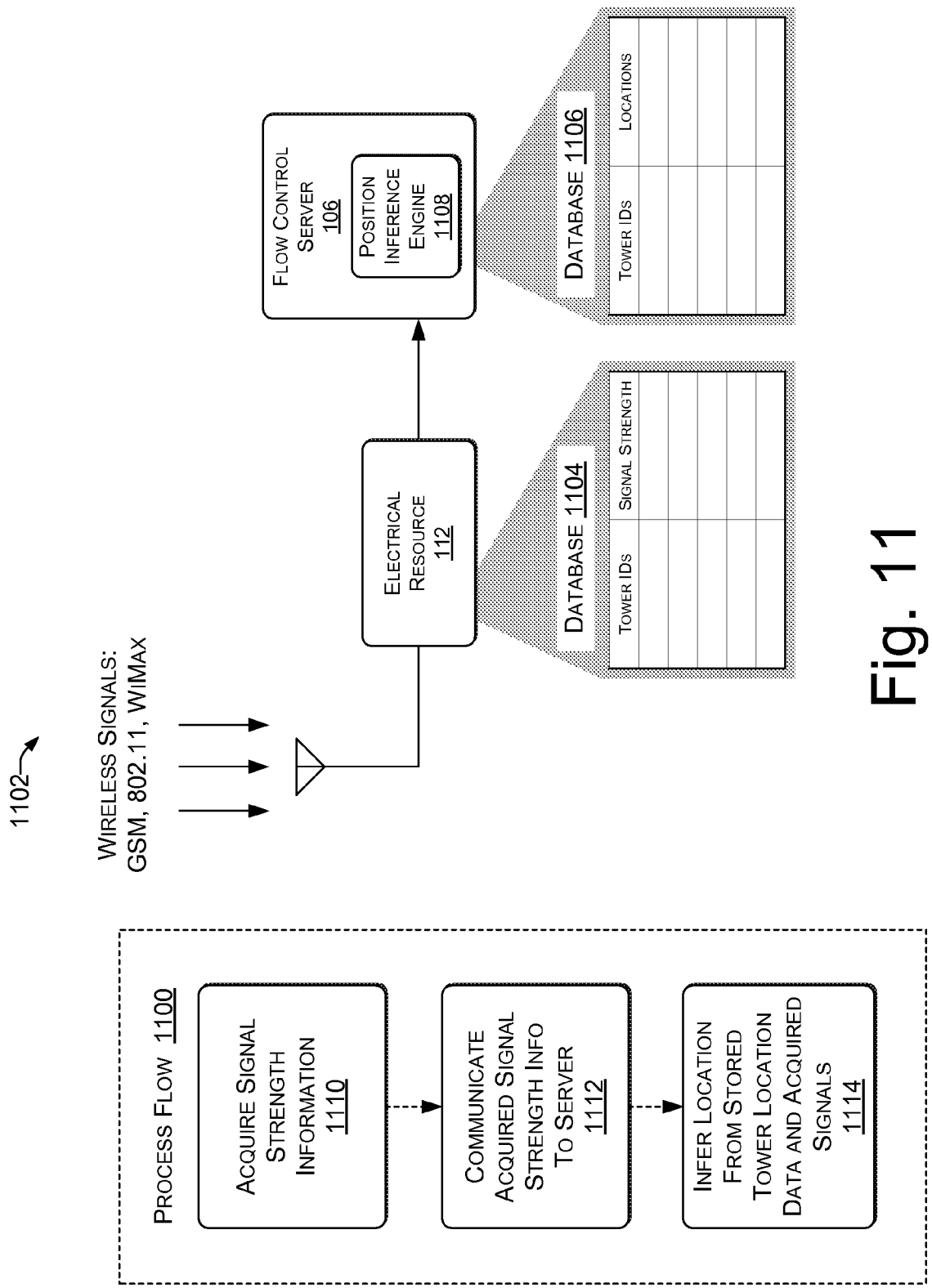
FIG. 11 is a diagram of a third exemplary technique for locating a connection location of an electric resource on the power grid.

FIG. 11 shows another exemplary method 1100 and system 1102 for determining the location of a mobile electric resource 112 on the power grid 114. In a scenario in which the electric resource 112 and the flow control server 106 conduct communications via a wireless signaling scheme, it is still desirable to determine the physical connection location during periods of connectedness with the grid 114.

Wireless networks (e.g., GSM, 802.11, WiMax) comprise many cells or towers that each transmit unique identifiers. Additionally, the strength of the connection between a tower and mobile clients connecting to the tower is a function of the client's proximity to the tower. When an electric vehicle 200 is connected to the grid 114, the remote IPF module 134 can acquire the unique identifiers of the available towers and relate these to the signal strength of each connection, as shown in database 1104. The remote IPF module 134 of the electric resource 112 transmits this information to the flow control server 106, where the information is combined with survey data, such as database 1106 so that a position inference engine 1108 can triangulate or otherwise infer the physical location of the connected electric vehicle 200. In another enablement, the IPF module 134 can use the signal strength readings to resolve the resource location directly, in which case the IPF module 134 transmits the location information instead of the signal strength information.

Thus, the exemplary method 1100 includes acquiring (1110) the signal strength information; communicating (1112) the acquired signal strength information to the flow control server 106; and inferring (1114) the physical location using stored tower location information and the acquired signals from the electric resource 112.

Figure 12:
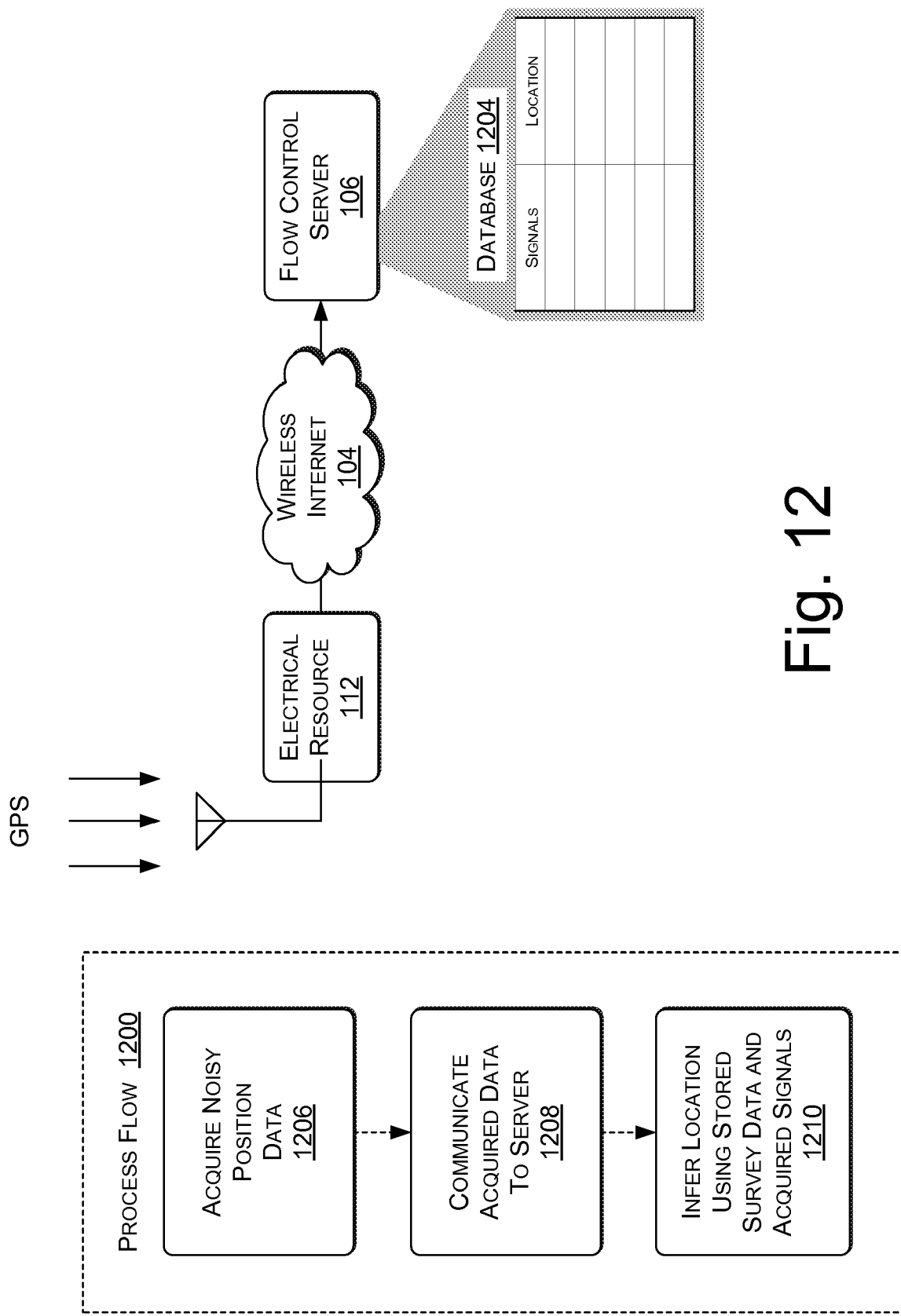
FIG. 12 is a diagram of a fourth exemplary technique for locating a connection location of an electric resource on the power grid network.

FIG. 12 shows a method 1200 and system 1202 for using signals from a global positioning satellite (GPS) system to determine a physical location of a mobile electric resource 112 on the power grid 114. Using GPS enables a remote IPF module 134 to resolve its physical location on the power network in a non-exact manner. This noisy location information from GPS is transmitted to the flow control server 106, which uses it with a survey information database 1204 to infer the location of the electric resource 112.

The exemplary method 1200 includes acquiring (1206) the noisy position data; communicating (1208) the acquired noisy position data to the flow control server 106; and inferring (1210) the location using the stored survey information and the acquired data.

Exemplary Transaction Methods and Business Methods

The exemplary power aggregation system 100 supports the following functions and interactions:

1. Setup—The power aggregation system 100 creates contracts outside the system and/or bids into open markets to procure contracts for power services contracts via the web server 718 and contract manager 720. The system 100 then resolves these requests into specific power requirements upon dispatch from the grid operator 404, and communicates these requirements to vehicle owners 408 by one of several communication techniques.

2. Delivery—The grid interaction manager 712 accepts real-time grid control signals 714 from grid operators 404 through a power-delivery device, and responds to these signals 714 by delivering power services from connected electric vehicles 200 to the grid 114.

3. Reporting—After a power delivery event is complete, a transaction manager can report power services transactions stored in the database 716. A billing manager resolves these requests into specific credit or debit billing transactions. These transactions may be communicated to a grid operator's or utility's billing system for account reconciliation. The transactions may also be used to make payments directly to resource owners 408.

In one implementation, the vehicle-resident remote IPF module 134 may include a communications manager to receive offers to provide power services, display them to the user and allow the user to respond to offers. Sometimes this type of advertising or contracting interaction can be carried out by the electric resource owner 408 conventionally connecting with the web server 718 of the flow control server 106.

In an exemplary business model of managing vehicle-based load or storage, the exemplary power aggregation system 100 serves as an intermediary between vehicle owners 408 (individuals, fleets, etc.) and grid operators 404 (Independent System Operators (ISOs), Regional Tranmission Operators (RTOs), utilities, etc.).

The load and storage electric resource 112 presented by a single plug-in electric vehicle 200 is not a substantial enough resource for an ISO or utility to consider controlling directly. However, by aggregating many electric vehicles 200 together, managing their load behavior, and exporting a simple control interface, the power aggregation system 100 provides services that are valuable to grid operators 404.

Likewise, vehicle owners 408 may not be interested in participating without participation being made easy, and without there being incentive to do so. By creating value through aggregated management, the power aggregation system 100 can provide incentives to owners in the form of payments, reduced charging costs, etc. The power aggregation system 100 can also make the control of vehicle charging and uploading power to the grid 114 automatic and nearly seamless to the vehicle owner 408, thereby making participation palatable.

By placing remote IPF modules 134 in electric vehicles 200 that can measure attributes of power quality, the power aggregation system 100 enables a massively distributed sensor network for the power distribution grid 114. Attributes of power quality that the power aggregation system 100 can measure include frequency, voltage, power factor, harmonics, etc. Then, leveraging the communication infrastructure of the power aggregation system 100, including remote IPF modules 134, this sensed data can be reported in real time to the flow control server 106, where information is aggregated. Also, the information can be presented to the utility, or the power aggregation system 100 can directly correct undesirable grid conditions by controlling vehicle charge/power upload behavior of numerous electric vehicles 200, changing the load power factor, etc.

The exemplary power aggregation system 100 can also provide Uninteruptible Power Supply (UPS) or backup power for a home/business, including interconnecting islanding circuitry. In one implementation, the power aggregation system 100 allows electric resources 112 to flow power out of their batteries to the home (or business) to power some or all of the home's loads. Certain loads may be configured as key loads to keep "on" during a grid power-loss event. In such a scenario, it is important to manage islanding of the residence 124 from the grid 114. Such a system may include anti-islanding circuitry that has the ability to communicate with the electric vehicle 200, described further below as a smart breaker box. The ability of the remote IPF module 134 to communicate allows the electric vehicle 200 to know if providing power is safe, "safe" being defined as "safe for utility line workers as a result of the main breaker of the home being in a disconnected state." If grid power drops, the smart breaker box disconnects from the grid and then contacts any electric vehicles 200 or other electric resources 112 participating locally, and requests them to start providing power. When grid power returns, the smart breaker box turns off the local power sources, and then reconnects.

For mobile billing (for when the vehicle owner 408 is different than the meter account owner 410), there are two important aspects for the billing manager to reckon with during electric vehicle recharging: who owns the vehicle, and who owns the meter account of the facility where recharge is happening. When the vehicle owner 408 is different than the meter account owner 410, there are several options:

1. The meter owner 410 may give free charging.
2. The vehicle owner 408 may pay at the time of charging (via credit card, account, etc.)
3. A pre-established account may be settled automatically.

Without oversight of the power aggregation system 100, theft of services may occur. With automatic account settling, the power aggregation system 100 records when electric vehicles 200 charge at locations that require payment, via vehicle IDs and location IDs, and via exemplary metering of time-annotated energy flow in/out of the vehicle. In these cases, the vehicle owner 408 is billed for energy used, and that energy is not charged to the facility's meter account owner 410 (so double-billing is avoided). A billing manager that performs automatic account settling can be integrated with the power utility, or can be implemented as a separate debit/credit system.

An electrical charging station, whether free or for pay, can be installed with a user interface that presents useful information to the user. Specifically, by collecting information about the grid 114, the vehicle state, and the preferences of the user, the station can present information such as the current electricity price, the estimated recharge cost, the estimated time until recharge, the estimated payment for uploading power to the grid 114 (either total or per hour), etc. The information acquisition engine 414 communicates with the electric vehicle 20 and with public and/or private data networks 722 to acquire the data used in calculating this information.

The exemplary power aggregation system 100 also offers other features for the benefit of electric resource owners 408 (such as vehicle owners):

vehicle owners can earn free electricity for vehicle charging in return for participating in the system;
vehicle owners can experience reduced charging cost by avoiding peak time rates;
vehicle owners can receive payments based on the actual energy service their vehicle provides;
vehicle owners can receive a preferential tariff for participating in the system.

There are also features between the exemplary power aggregation system 100 and grid operators 404:

the power aggregation system 100 as electric resource aggregator can earn a management fee (which may be some function of services provided), paid by the grid operator 404.
the power aggregation system 100 as electric resource aggregator can sell into power markets 412;
grid operators 404 may pay for the power aggregation system 100, but operate the power aggregation system 100 themselves.

Exemplary Safety and Remote Smart-Islanding

The exemplary power aggregation system 100 can include methods and components for implementing safety standards and safely actuating energy discharge operations. For example, the exemplary power aggregation system 100 may use in-vehicle line sensors as well as smart-islanding equipment installed at particular locations. Thus, the power aggregation system 100 enables safe vehicle-to-grid operations. Additionally, the power aggregation system 100 enables automatic coordination of resources for backup power scenarios.

In one implementation, an electric vehicle 200 containing a remote IPF module 134 stops vehicle-to-grid upload of power if the remote IPF module 134 senses no line power originating from the grid 114. This halting of power upload prevents electrifying a cord that may be unplugged, or electrifying a powerline 206 that is being repaired, etc. However, this does not preclude using the electric vehicle 200 to provide backup power if grid power is down because the safety measures described below ensure that an island condition is not created.

Additional smart-islanding equipment installed at a charging location can communicate with the remote IPF module 134 of an electric vehicle 200 to coordinate activation of power upload to the grid 114 if grid power drops. One particular implementation of this technology is a vehicle-to-home backup power capability.

Figure 13:
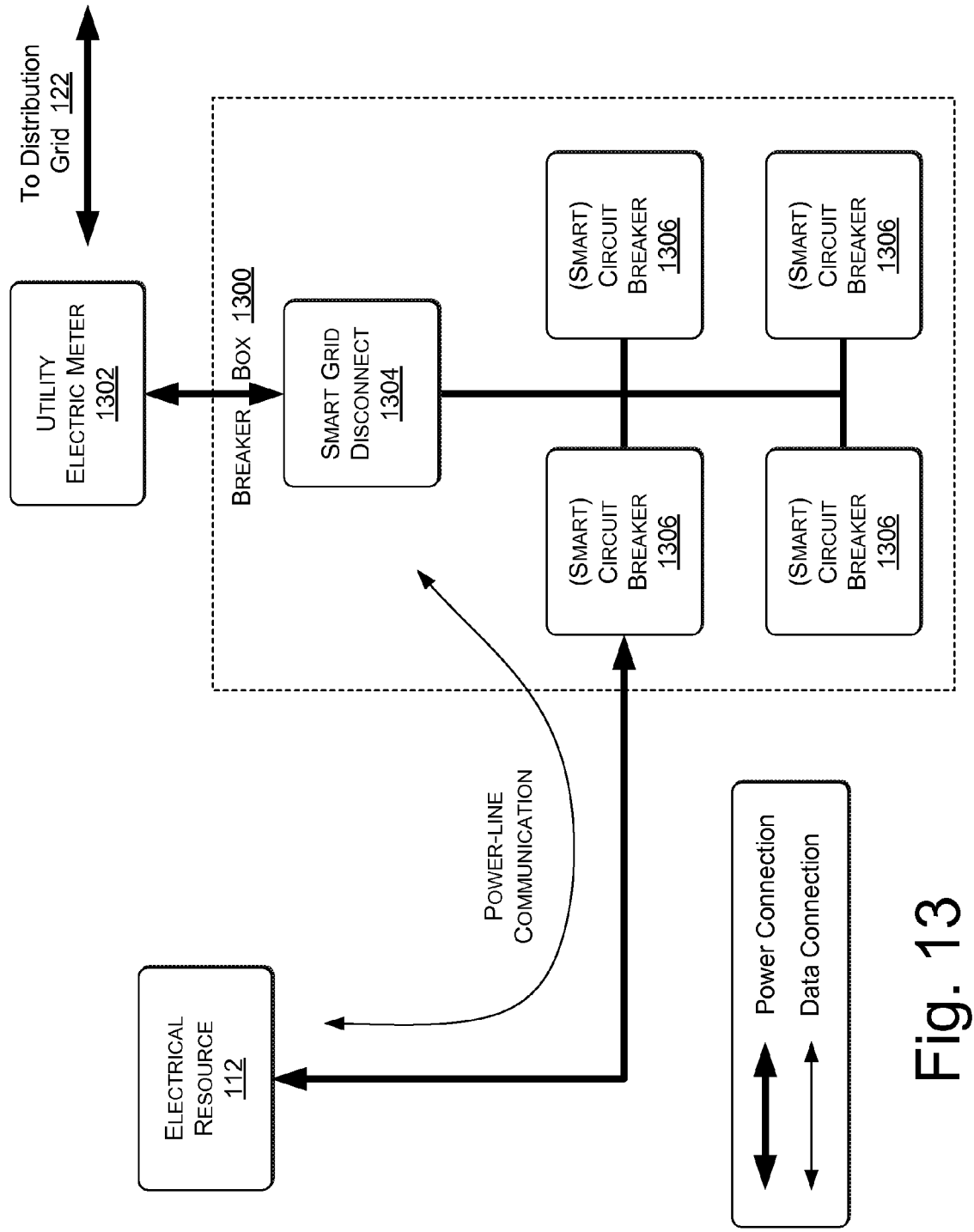
FIG. 13 is diagram of exemplary safety measures in a vehicle-to-home implementation of the power aggregation system.

FIG. 13 shows exemplary safety measures in a vehicle-to-home scenario, in which an electric resource 112 is used to provide power to a load or set of loads (as in a home). A breaker box 1300 is connected to the utility electric meter 1302. When an electric resource 112 is flowing power into the grid (or local loads), an islanding condition should be avoided for safety reasons. The electric resource 112 should not energize a line that would conventionally be considered de-energized in a power outage by line workers.

A locally installed smart grid disconnect (switch) 1304 senses the utility line in order to detect a power outage condition and coordinates with the electric resource 112 to enable vehicle-to-home power transfer. In the case of a power outage, the smart grid disconnect 1304 disconnects the circuit breakers 1306 from the utility grid 114 and communicates with the electric resource 112 to begin power backup services. When the utility services return to operation, the smart grid disconnect 1304 communicates with the electric resource 112 to disable the backup services and reconnect the breakers to the utility grid 114.

Figure 14:
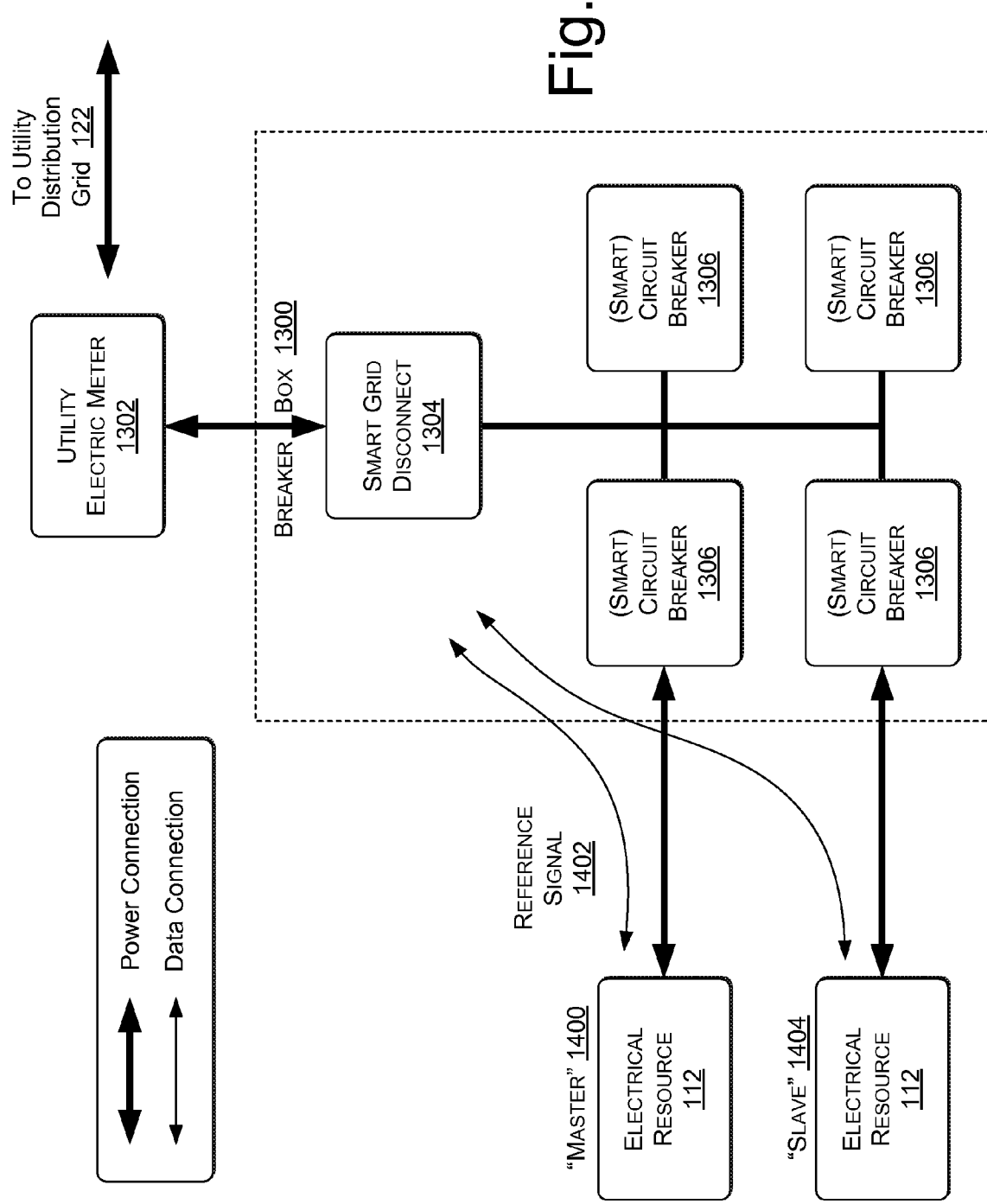
FIG. 14 is a diagram of exemplary safety measures when multiple electric resources flow power to a home in the power aggregation system.

FIG. 14 shows exemplary safety measures when multiple electric resources 112 power a home. In this case, the smart grid disconnect 1304 coordinates with all connected electric resources 112. One electric resource 112 is deemed the "master" 1400 for purposes of generating a reference signal 1402 and the other resources are deemed "slaves" 1404 and follow the reference of the master 1400. In a case in which the master 1400 disappears from the network, the smart grid disconnect 1304 assigns another slave 1404 to be the reference/master 1400.

Figure 15:
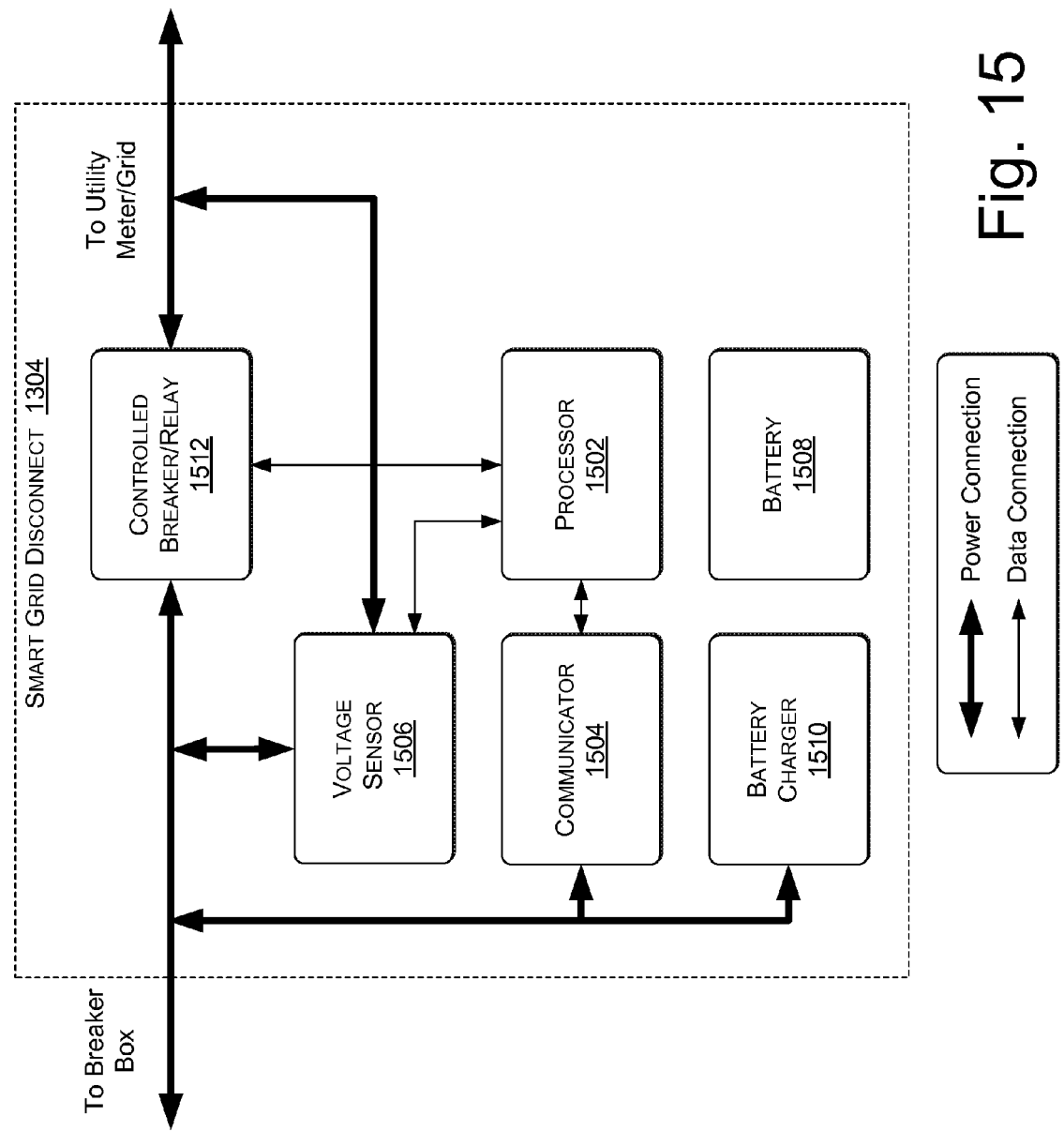
FIG. 15 is a block diagram of an exemplary smart disconnect of the power aggregation system.

FIG. 15 shows the smart grid disconnect 1304 of FIGS. 13 and 14, in greater detail. In one implementation, the smart grid disconnect 1304 includes a processor 1502, a communicator 1504 coupled with connected electric resources 112, a voltages sensor 1506 capable of sensing both the internal and utility-side AC lines, a battery 1508 for operation during power outage conditions, and a battery charger 1510 for maintaining the charge level of the battery 1508. A controlled breaker or relay 1512 switches between grid power and electric resource-provided power when signaled by the processor 1502.

Exemplary User Experience Options

The exemplary power aggregation system 100 can enable a number of desirable user features:

- data collection can include distance driven and both electrical and non-electrical fuel usage, to allow derivation and analysis of overall vehicle efficiency (in terms of energy, expense, environmental impact, etc.). This data is exported to the flow control server 106 for storage 716, as well as for display on an in-vehicle user interface, charging station user interface, and web/cell phone user interface.
- intelligent charging learns the vehicle behavior and adapts the charging timing automatically. The vehicle owner 408 can override and request immediate charging if desired.

Exemplary Methods

Figure 16:
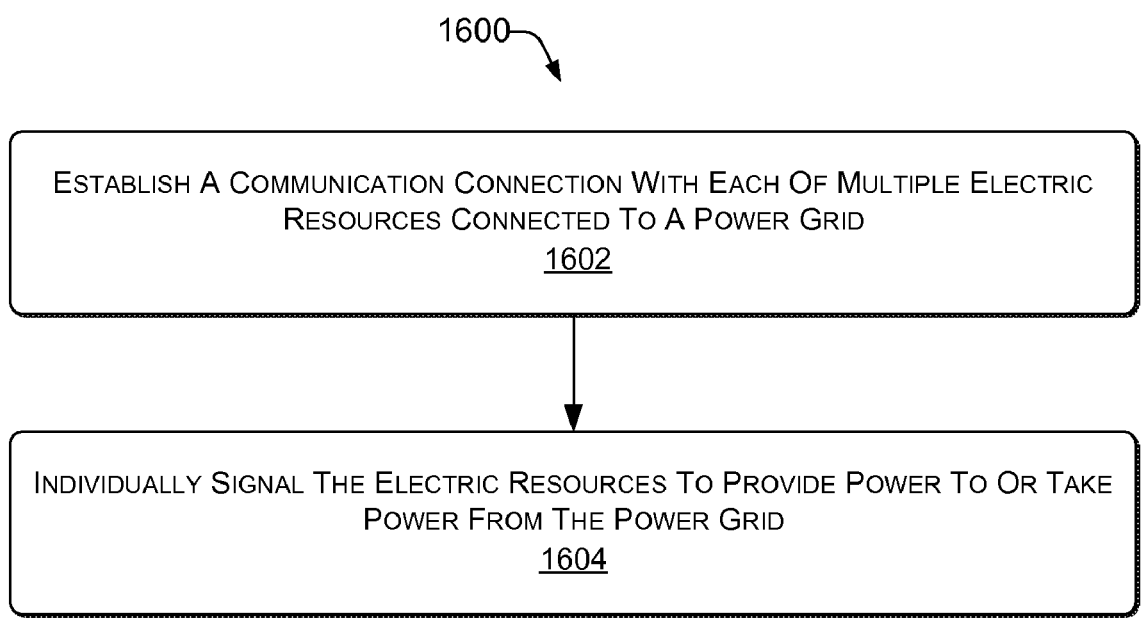
FIG. 16 is a flow diagram of an exemplary method of power aggregation.

FIG. 16 shows an exemplary method 1600 of power aggregation. In the flow diagram, the operations are summarized in individual blocks. The exemplary method 1600 may be performed by hardware, software, or combinations of hardware, software, firmware, etc., for example, by components of the exemplary power aggregation system 100.

At block 1602, communication is established with each of multiple electric resources connected to a power grid. For example, a central flow control service can manage numerous intermittent connections with mobile electric vehicles, each of which may connect to the power grid at various locations. An in-vehicle remote agent connects each vehicle to the Internet when the vehicle connects to the power grid.

At block 1604, the electric resources are individually signaled to provide power to or take power from the power grid.

Figure 17:
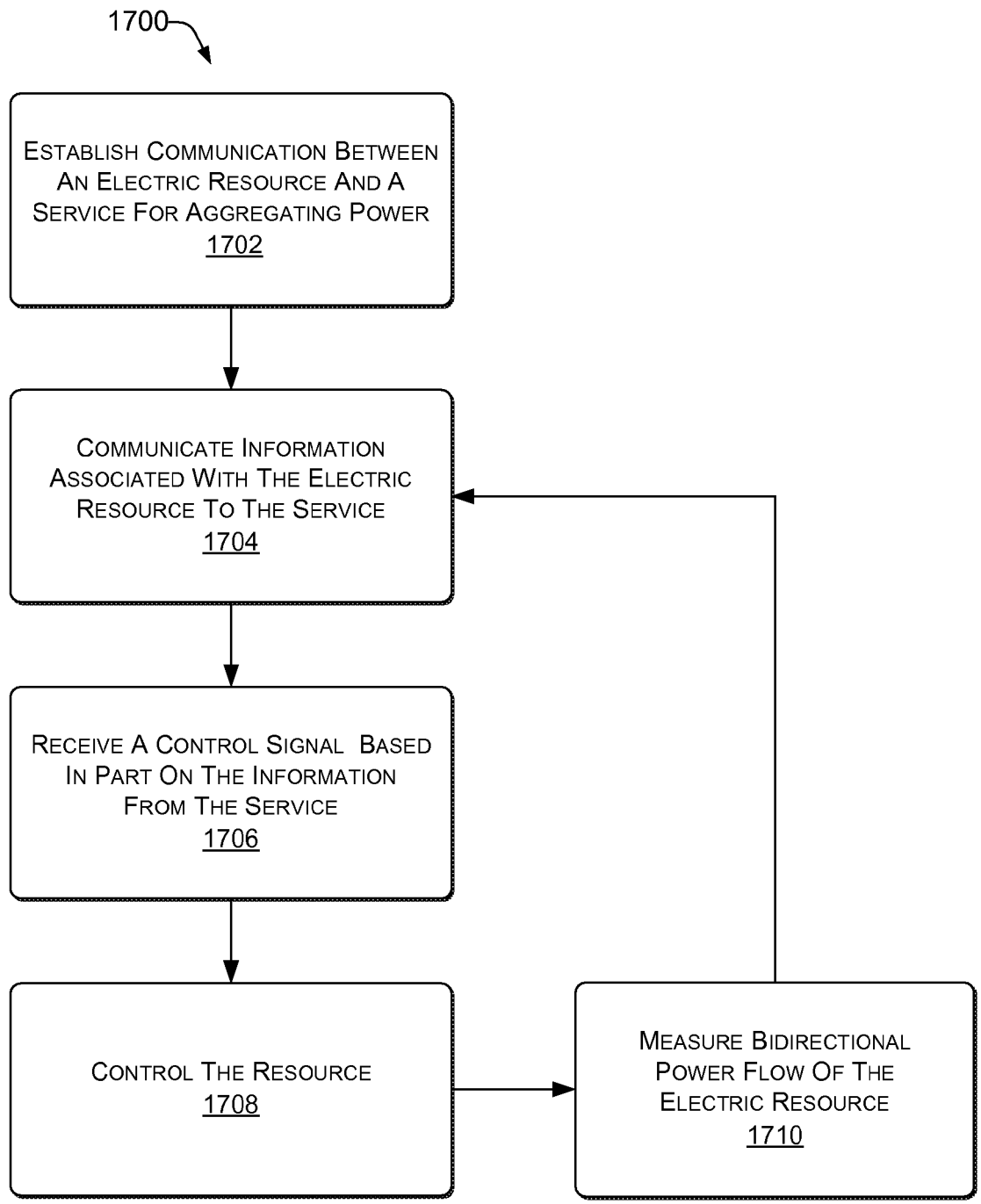
FIG. 17 is a flow diagram of an exemplary method of communicatively controlling an electric resource for power aggregation.

FIG. 17 is a flow diagram of an exemplary method of communicatively controlling an electric resource for power aggregation. In the flow diagram, the operations are summarized in individual blocks. The exemplary method 1700 may be performed by hardware, software, or combinations of hardware, software, firmware, etc., for example, by components of the exemplary intelligent power flow (IPF) module 134.

At block 1702, communication is established between an electric resource and a service for aggregating power.

At block 1704, information associated with the electric resource is communicated to the service.

At block 1706, a control signal based in part upon the information is received from the service.

At block 1708, the resource is controlled, e.g., to provide power to the power grid or to take power from the grid, i.e., for storage.

At block 1710, bidirectional power flow of the electric device is measured, and used as part of the information associated with the electric resource that is communicated to the service at block 1704.

Figure 18:
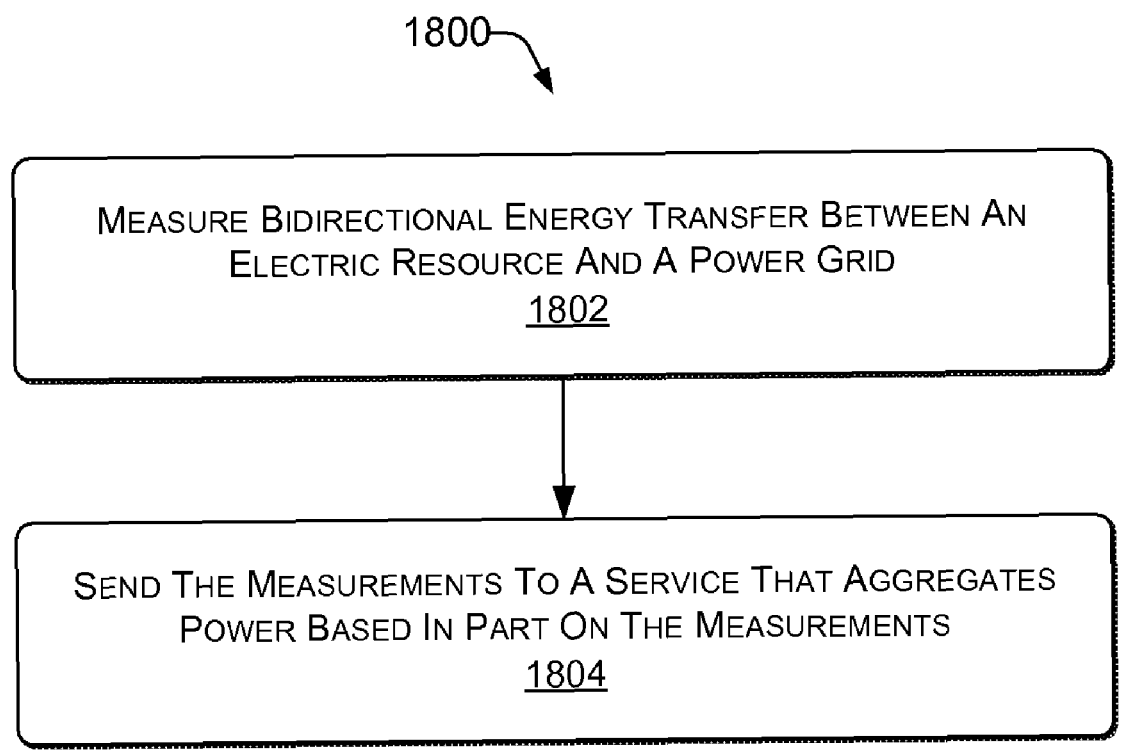
FIG. 18 is a flow diagram of an exemplary method of metering bidirectional power of an electric resource.

FIG. 18 is a flow diagram of an exemplary method of metering bidirectional power of an electric resource. In the flow diagram, the operations are summarized in individual blocks. The exemplary method 1800 may be performed by hardware, software, or combinations of hardware, software, firmware, etc., for example, by components of the exemplary power flow meter 824.

At block 1802, energy transfer between an electric resource and a power grid is measured bidirectionally.

At block 1804, the measurements are sent to a service that aggregates power based in part on the measurements.

Figure 19:
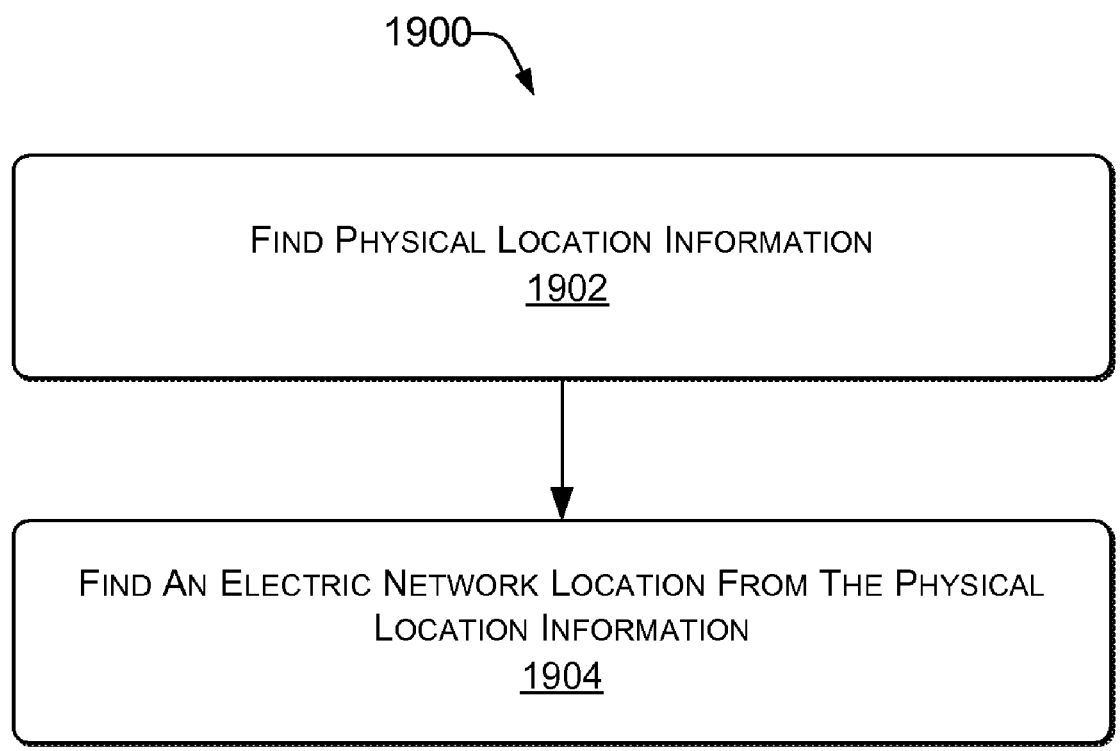
FIG. 19 is a flow diagram of an exemplary method of determining an electric network location of an electric resource.

FIG. 19 is a flow diagram of an exemplary method of determining an electric network location of an electric resource. In the flow diagram, the operations are summarized in individual blocks. The exemplary method 1900 may be performed by hardware, software, or combinations of hardware, software, firmware, etc., for example, by components of the exemplary power aggregation system 100.

At block 1902, physical location information is determined. The physical location information may be derived from such sources as GPS signals or from the relative strength of cell tower signals as an indicator of their location. Or, the physical location information may derived by receiving a unique identifier associated with a nearby device, and finding the location associated with that unique identifier.

At block 1904, an electric network location, e.g., of an electric resource or its connection with the power grid, is determined from the physical location information.

Figure 20:
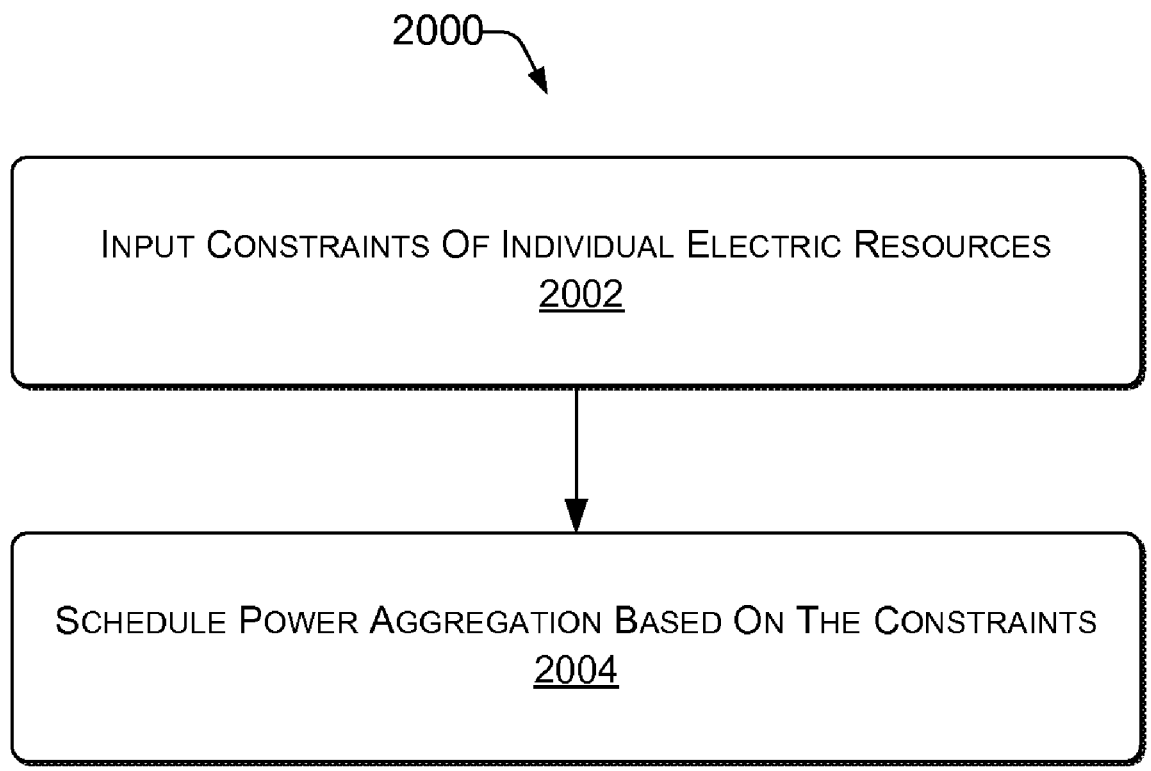
FIG. 20 is a flow diagram of an exemplary method of scheduling power aggregation.

FIG. 20 is a flow diagram of an exemplary method of scheduling power aggregation. In the flow diagram, the operations are summarized in individual blocks. The exemplary method 2000 may be performed by hardware, software, or combinations of hardware, software, firmware, etc., for example, by components of the exemplary flow control server 106.

At block 2002, constraints associated with individual electric resources are input.

At block 2004, power aggregation is scheduled, based on the input constraints.

Figure 21:
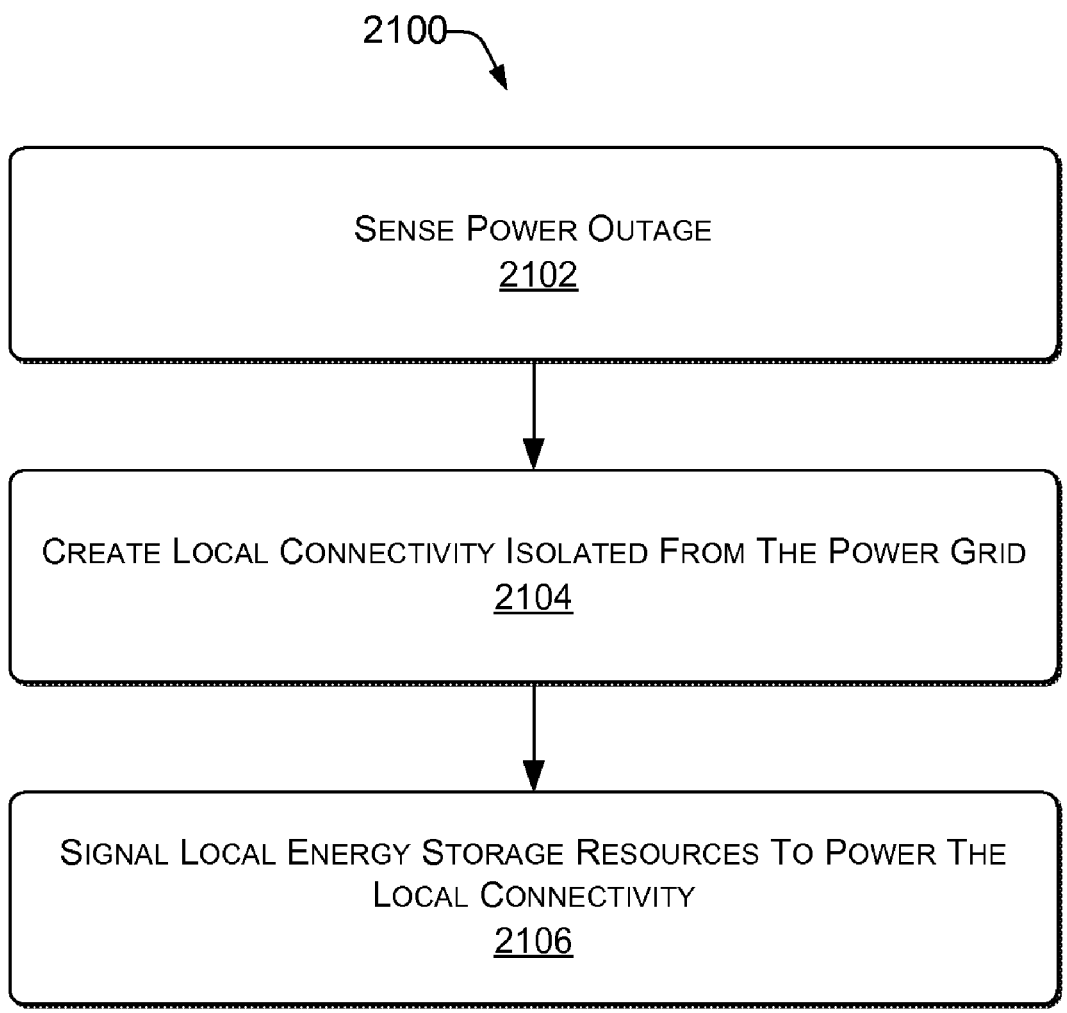
FIG. 21 is a flow diagram of an exemplary method of smart islanding.

FIG. 21 is a flow diagram of an exemplary method of smart islanding. In the flow diagram, the operations are summarized in individual blocks. The exemplary method 2100 may be performed by hardware, software, or combinations of hardware, software, firmware, etc., for example, by components of the exemplary power aggregation system 100.

At block 2102, a power outage is sensed.

At block 2104, a local connectivity—a network isolated from the power grid—is created.

At block 2106, local energy storage resources are signaled to power the local connectivity.

Figure 22:
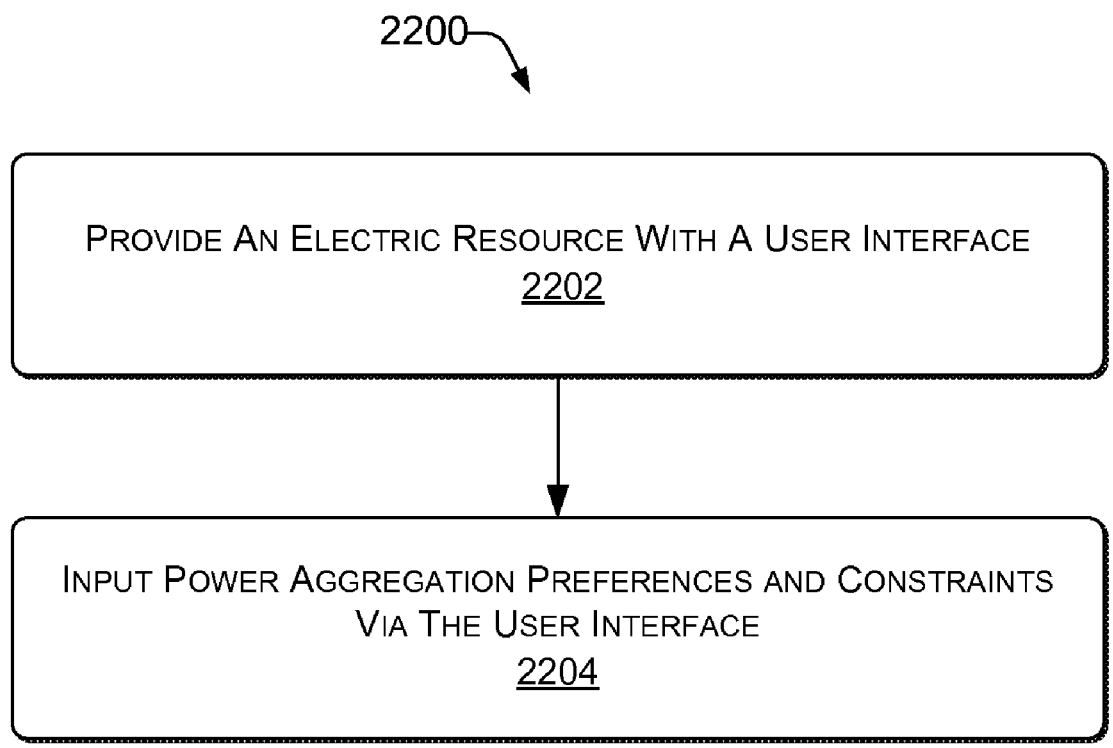
FIG. 22 is a flow diagram of an exemplary method of extending a user interface for power aggregation.

FIG. 22 is a flow diagram of an exemplary method of extending a user interface for power aggregation. In the flow diagram, the operations are summarized in individual blocks. The exemplary method 2200 may be performed by hardware, software, or combinations of hardware, software, firmware, etc., for example, by components of the exemplary power aggregation system 100.

At block 2202, a user interface is associated with an electric resource. The user interface may displayed in, on, or near an electric resource, such as an electric vehicle that includes an energy storage system, or the user interface may be displayed on a device associated with the owner of the electric resource, such as a cell phone or portable computer.

At block 2204, power aggregation preferences and constraints are input via the user interface. In other words, a user may control a degree of participation of the electric resource in a power aggregation scenario via the user interface. Or, the user may control the characteristics of such participation.

Figure 23:
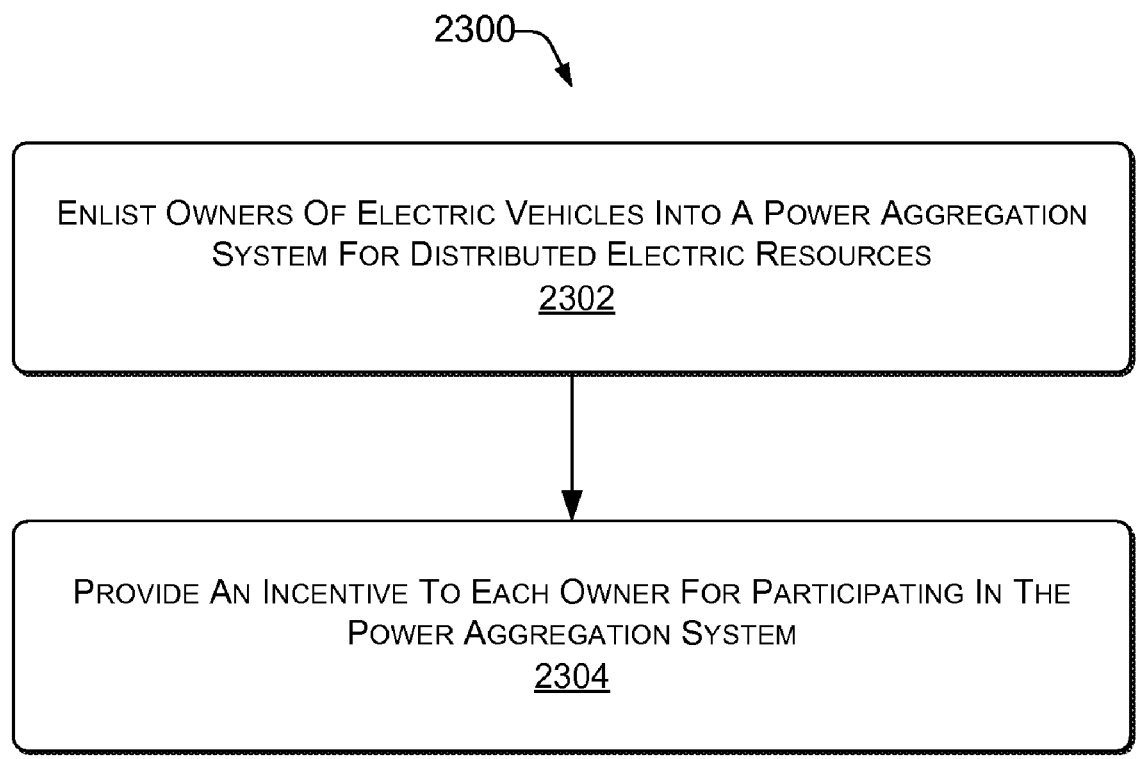
FIG. 23 is a flow diagram of an exemplary method of gaining and maintaining electric vehicle owners in a power aggregation system.

FIG. 23 is a flow diagram of an exemplary method of gaining and maintaining electric vehicle owners in a power aggregation system. In the flow diagram, the operations are summarized in individual blocks. The exemplary method 2300 may be performed by hardware, software, or combinations of hardware, software, firmware, etc., for example, by components of the exemplary power aggregation system 100.

At block 2302, electric vehicle owners are enlisted into a power aggregation system for distributed electric resources.

At block 2304, an incentive is provided to each owner for participation in the power aggregation system.

At block 2306, recurring continued service to the power aggregation system is repeatedly compensated.

CONCLUSION

Although exemplary systems and methods have been described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A method of inputting and displaying information in a power aggregation system, comprising:
    associating a user interface with an electric resource;
    interacting with a user or owner of the electric resource via the user interface, wherein the electric resource comprises an electric vehicle, and wherein the user or owner controls a degree of participation of the electric resource in power aggregation via the user interface; and,
    displaying parameters of the power aggregation system on the user interface;
    wherein constraints and/or preferences to be input and/or the parameters to be displayed include at least one of: an energy pricing preference of an owner of the electric resource, a vehicle state-of-charge, a predicted amount of time until the electric resource disconnects from a power grid, a preference of the owner of the electric resource for revenue over a state-of-charge quality of the electric resource, electrical limits of the electric resource, and user-selectable manual charging overrides of the power aggregation system.

2. The method as recited in claim 1, wherein the user interface inputs user-selected power aggregation constraints and user-selected power aggregation preferences via the user interface.

3. The method as recited in claim 1, wherein the user interface inputs and displays information regarding the electric vehicle.

4. The method as recited in claim 1, wherein the user interface comprises an in-vehicle user interface, a charging station user interface, a web-based user interface, or a cell phone user interface.

5. The method as recited in claim 1, wherein the user interface is accessible online by an owner of the electric vehicle.

6. The method as recited in claim 1, wherein the user interface extends access to a user account of the power aggregation system via a password.

7. The method as recited in claim 1, wherein the user interface is extended by the power aggregation system over a same communication channel that the power aggregation system uses to signal the electric resource to provide power to a power grid or take power from a power grid.

8. The method as recited in claim 1, wherein the user interface is extended by the power aggregation system over the Internet or over a wireless medium.

9. The method as recited in claim 1, wherein communication between the electric resource and the power aggregation system is encrypted.

10. The method as recited in claim 1, wherein the user interface displays checkboxes, icons, and/or menus for user-selection of preferences, constraints, customizations, and optimizations of the power aggregation system with respect to system parameters, electric resource parameters, and electric resource/power aggregation system interactions.

11. The method as recited in claim 1, wherein the user interface advertises energy prices and offers to participate in power aggregation to a user and securely obtains commitments from the user.

12. The method as recited in claim 1, wherein the electric resource comprises an electric vehicle and the user interface displays distance driven, electrical and non-electrical fuel usage, and overall vehicle efficiency with respect to energy use, expense, and environmental impact.

13. The method as recited in claim 12, wherein the user interface further comprises an override for requesting immediate charging of the electric vehicle.

14. The method as recited in claim 1, wherein the power aggregation system learns behavior of the electric vehicle and learns user behavior via the user interface and adapts a charging timing automatically.

15. An operator interface for a power aggregation system, comprising:
    a display displaying parameters of the power aggregation system on a user interface;
    an input device;
    display objects, which when selected by the input device provide an operator access to operations of the power aggregation system, including electrical resource control, bidding and contract with energy markets and power grid operators, load protection, constraint optimization, data storage, and resource owner interaction, wherein the operator controls a degree of participation of an electric resource in power aggregation via the operator interface;

wherein constraints and/or preferences to be input and/or the parameters to be displayed include at least one of: an energy pricing preference of an owner of the electric resource, a vehicle state-of-charge, a predicted amount of time until the electric resource disconnects from a power grid, a preference of the owner of the electric resource for revenue over a state-of-charge quality of the electric resource, electrical limits of the electric resource, and user-selectable manual charging overrides of the power aggregation system.

16. The operator interface for a power aggregation system as recited in claim 15, further comprising a map of power aggregation activity across at least part of the power aggregation system.

* * * * *